(12) United States Patent
Campos et al.

(10) Patent No.: US 11,201,777 B2
(45) Date of Patent: Dec. 14, 2021

(54) SYSTEMS AND METHODS FOR A UNIVERSAL DATA LINK

(71) Applicant: CABLE TELEVISION LABORATORIES, INC., Louisville, CO (US)

(72) Inventors: Luis Alberto Campos, Superior, CO (US); Jennifer Andreoli-Fang, Boulder, CO (US); Judson D. Cary, Denver, CO (US); David Daniel Smith, Boulder, CO (US)

(73) Assignee: Cable Television Laboratories, ino., Louisville, CO (US)

( * ) Notice: Subject to any disclaimer, the term of this patent is extended or adjusted under 35 U.S.C. 154(b) by 14 days.

(21) Appl. No.: 16/255,764

(22) Filed: Jan. 23, 2019

(65) Prior Publication Data
US 2019/0229974 A1 Jul. 25, 2019

Related U.S. Application Data

(60) Provisional application No. 62/620,615, filed on Jan. 23, 2018, provisional application No. 62/646,221, (Continued)

(51) Int. Cl.
*H04L 27/26* (2006.01)
*H04L 29/08* (2006.01)
(Continued)

(52) U.S. Cl.
CPC ........ *H04L 27/2697* (2013.01); *H04L 1/0003* (2013.01); *H04L 27/0008* (2013.01); *H04L 69/323* (2013.01); *H04L 2001/0097* (2013.01)

(58) Field of Classification Search
CPC ............ H04L 27/2697; G09G 2370/10; G09G 5/006; H04B 1/0053; H04B 10/61; H04B 1/38
See application file for complete search history.

(56) References Cited

U.S. PATENT DOCUMENTS

| | | | | | |
|---|---|---|---|---|---|
| 6,044,107 | A | * | 3/2000 | Gatherer | H04L 1/0003 375/222 |
| 6,055,268 | A | * | 4/2000 | Timm | H04L 5/1438 375/229 |

(Continued)

*Primary Examiner* — Raj Jain
(74) *Attorney, Agent, or Firm* — PdZ Patent Law, PLLC

(57) ABSTRACT

A method for transmitting data through a multi-media communication network includes converting transmission entities into data symbols at a first communication device, transmitting the data symbols from the first communication device to a second communication device through at least two different types of communication media using only lower PHY layers of the at least two different types of communication media, and converting the data symbols into transmission entities at the second communication device. A network implementing a universal data link includes a first communication device configured to convert transmission entities into data symbols, a second communication device configured to convert the data symbols into transmission entities, at least a first communication medium and a second communication medium communicatively coupled between the first communication device and the second communication device, and a first physical-layer translator configured to translate data symbols without converting the data symbols into transmission entities.

21 Claims, 17 Drawing Sheets

Related U.S. Application Data filed on Mar. 21, 2018, provisional application No. 62/772,117, filed on Nov. 28, 2018, provisional application No. 62/777,857, filed on Dec. 11, 2018.

(51) Int. Cl.
*H04L 27/00* (2006.01)
*H04L 1/00* (2006.01)

(56) References Cited

U.S. PATENT DOCUMENTS

| | | | | |
|---|---|---|---|---|
| 7,334,253 | B2* | 2/2008 | Howard | H04L 1/0006 455/423 |
| 7,418,240 | B2* | 8/2008 | Hsu | H04L 1/0003 370/252 |
| 8,724,485 | B2* | 5/2014 | Kliger | H04L 12/40117 370/252 |
| 9,124,405 | B2* | 9/2015 | Lovell | H04L 27/38 |
| 2002/0061012 | A1* | 5/2002 | Thi | H04M 7/125 370/352 |
| 2003/0058885 | A1* | 3/2003 | Sorenson | H04J 4/00 370/468 |
| 2004/0181811 | A1* | 9/2004 | Rakib | H04N 21/643 725/122 |
| 2007/0032256 | A1* | 2/2007 | Kolze | H04B 17/24 455/522 |
| 2008/0212493 | A1* | 9/2008 | Lenz | H04L 12/40013 370/254 |
| 2009/0061790 | A1* | 3/2009 | Rofougaran | H04B 1/0053 455/75 |
| 2011/0196929 | A1* | 8/2011 | Diab | H04N 5/85 709/204 |
| 2013/0191706 | A1* | 7/2013 | Zopf | H04L 1/0014 714/776 |
| 2013/0203454 | A1* | 8/2013 | Almgren | H04W 12/122 455/509 |
| 2014/0094188 | A1* | 4/2014 | Kazmi | H04W 4/023 455/456.1 |
| 2014/0195637 | A1* | 7/2014 | Tahir | H04B 3/542 709/217 |
| 2015/0131521 | A1* | 5/2015 | Hunzinger | H04L 69/18 370/315 |
| 2016/0112310 | A1* | 4/2016 | Forbes, Jr. | H04L 45/72 370/389 |
| 2017/0078108 | A1* | 3/2017 | Kitahara | H04L 12/1845 |
| 2017/0180176 | A1* | 6/2017 | Volkov | H04L 27/2602 |
| 2017/0318133 | A1* | 11/2017 | Oksman | H04L 69/323 |
| 2018/0123757 | A1* | 5/2018 | Ko | H04L 5/0092 |
| 2019/0229974 | A1* | 7/2019 | Campos | H04L 27/0008 |
| 2020/0162427 | A1* | 5/2020 | Clark | G06F 21/606 |

* cited by examiner

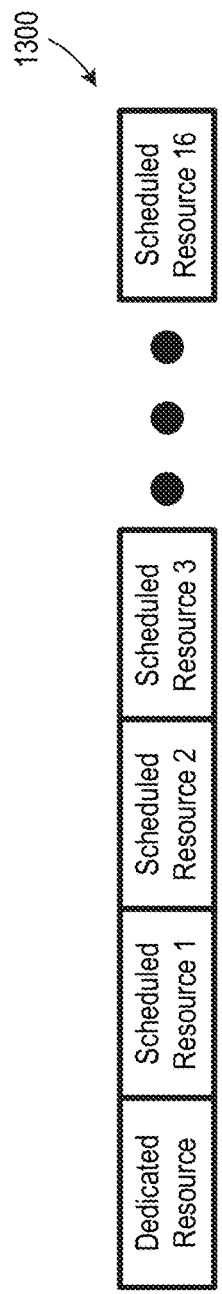
FIG. 13
FIG. 14
FIG. 15

SYSTEMS AND METHODS FOR A UNIVERSAL DATA LINK

RELATED APPLICATIONS

This application claims benefit for priority of (a) U.S. Provisional Patent Application Ser. No. 62/620,615 filed on Jan. 23, 2018, (b) U.S. Provisional Patent Application Ser. No. 62/646,221 filed on Mar. 21, 2018, (c) U.S. Provisional Patent Application Ser. No. 62/772,117 filed on Nov. 28, 2018, and (d) U.S. Provisional Patent Application Ser. No. 62/777,857 filed on Dec. 11, 2018. Each of the above-mentioned patent applications is incorporated herein by reference.

BACKGROUND

Many communication networks use two or more different communication mediums to transmit data. For example, hybrid fiber-coaxial (HFC) cable television networks use both fiber optic cables and coaxial cables to connect end users with a cable television headend. As another example, modern telephone networks typically use fiber optic cables and twisted-pair cables to connect end users with a telephone central office. As yet another example, mobile telephone communication networks frequently use both wireless transmission mediums and fiber optic cables to connect end users with a telephone system core node.

Digital communication networks are commonly modeled using an open systems interconnection (OSI) model, where each node in the network is represented by an OSI layer stack. The OSI layer stack makeup will vary among applications, but the layer stack typically includes at least some of the following layers in order from bottom to top: (1) a physical layer, (2) a data link layer, (3) a network layer, (4) a transport layer, (5) a session layer, (6) a presentation layer, and (7) an application layer.

The physical layer (layer 1) facilitates transfer of data symbols across a physical communication medium, such as by defining interfaces with the communication medium. The data link layer (layer 2) may encode transmission entities received from upper layers into bits for the physical layer. Additionally, the data link layer may decode bits receive from the physical layer into transmission entities for upper layers. Furthermore, the data link layer may provide transmission protocol and management, frame synchronization, and flow control. The data link layer often includes two sublayers, i.e., a medium access control (MAC) sublayer and a logical link control (LLC) sublayer. The network layer (layer 3) provides switching and routing, and the transport layer (layer 4) helps ensure complete data transfer. The session layer (layer 5) controls connections between applications, and the presentation layer (layer 6) translates between an application format and a network format. Finally, the application layer (layer 7) supports application processes.

As one example of network operation according to the OSI model, consider a network where device A sends data to device B over a communication medium C. At device A, data travels down device A's OSI layer stack from its application layer to its physical layer. The data then travels from device A's physical layer to device B's physical layer via communication medium C, and the data then travels up device B's OSI layer stack from its physical layer to its application layer.

BRIEF DESCRIPTION OF THE FIGURES

FIG. 13 is a schematic diagram illustrating an uplink transmission entity, according to an embodiment.

FIG. 14 is a schematic diagram illustrating a dedicated resource of the FIG. 13 uplink transmission entity.

FIG. 15 is a schematic diagram illustrating a scheduled resource of the FIG. 13 uplink transmission entity.

DETAILED DESCRIPTION OF THE EMBODIMENTS

Disclosed herein are systems and methods for a universal data link. Certain embodiments of the systems and methods use a universal data link to transmit data through two or more different communication mediums, e.g., optical, coaxial cable, wireless, and/or twisted pair communication mediums. In particular embodiments, transmission entities are converted into physical layer bit streams, which are forward error correction (FEC) encoded into longer coded bit streams and are subsequently mapped into physical data symbols at the beginning of a transmission path, and the data remains in the form of physical data symbols while being transported through the two or more communication mediums. The physical data symbols are de-mapped into coded bit streams that are subsequently FEC decoded into original physical layer bit streams, which are then converted to transmission entities at the end of the transmission path. Consequently, in these embodiments, data does not traverse an entire OSI layer stack when transitioning between different communication mediums; instead physical data symbols from one communication medium are mapped or translated to physical data symbols of another communication medium when transitioning between the two communication mediums. Such use of universal data link may achieve significant advantages, as discussed below.

Figure 1:
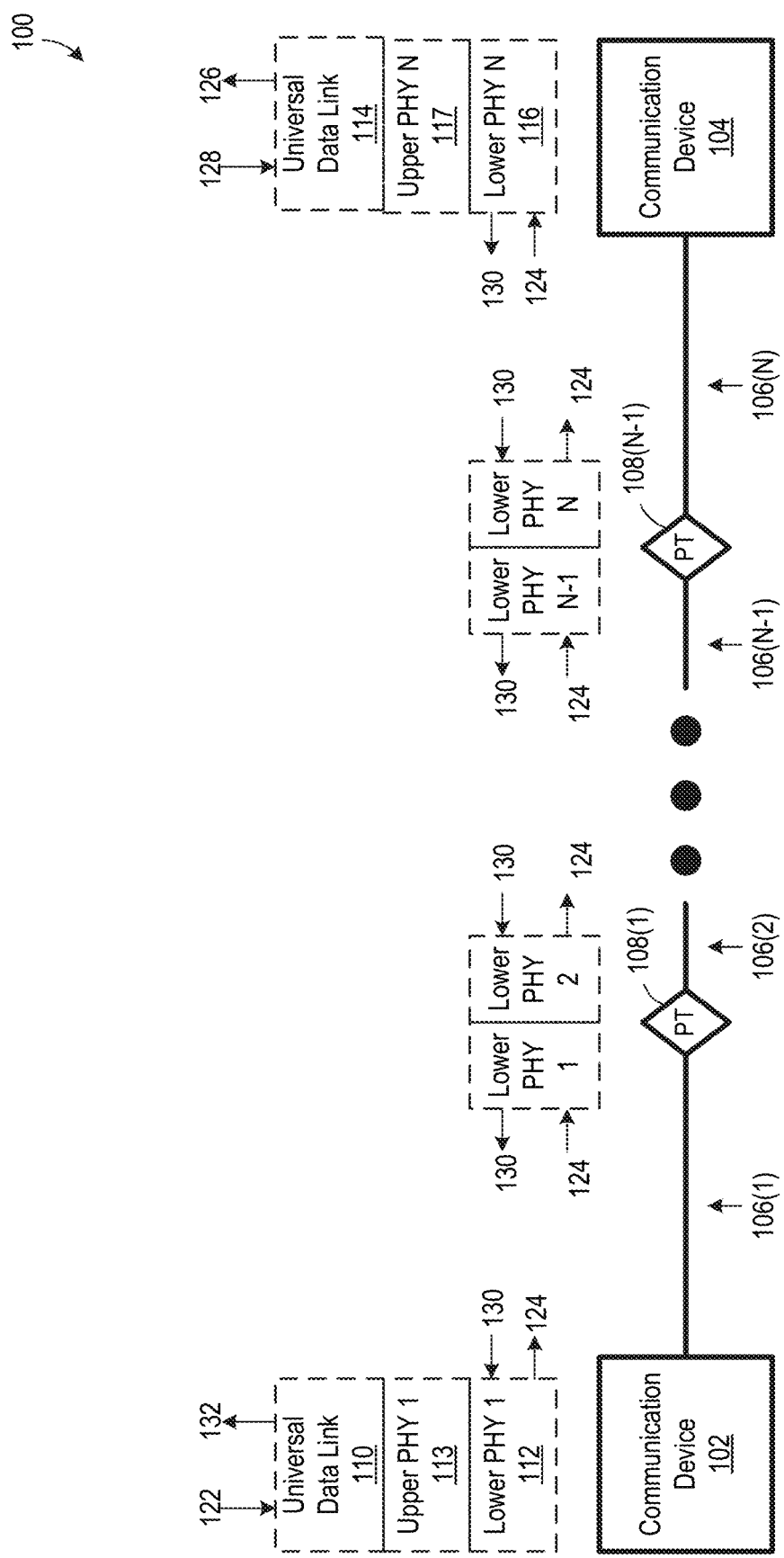
FIG. 1 is a schematic diagram illustrating a network implementing a universal data link, according to an embodiment.

FIG. 1 is a schematic diagram illustrating a network 100 implementing a universal data link. Network 100 includes a first communication device 102, a second communication device 104, N communication mediums 106, and N-1 physical layer (PHY) translators 108, where N is an integer greater than one. Although FIG. 1 illustrates N being four or greater, N could be two or three without departing from the scope hereof. Communication mediums 106 are communicatively coupled between first communication device 102 and second communication device 104, and communication mediums 106 transmit data between first communication device 102 and second communication device 104, as discussed below. In this document, specific instances of an item may be referred to by use of a numeral in parentheses (e.g., communication medium 106(1)) while numerals without parentheses refer to any such item (e.g., communication media 106).

First communication device 102 implements at least a universal data link 110, a lower PHY layer 112, and an upper PHY layer 113. In some embodiments, data link 110 includes one or more of a MAC sublayer and a LLC sublayer. First communication device 102 optionally also implements one or more additional layers, e.g., one or more of a network layer, a transport layer, a session layer, a presentation layer, and an application layer (not shown), above data link 110. Additionally, second communication device 104 implements at least a universal data link 114, a lower PHY layer 116, and an upper PHY layer 117. In some embodiments, data link 114 includes one or more of a MAC sublayer and a LLC sublayer. Second communication device 104 also optionally implements one or more additional layers, e.g., one or more of a network layer, a transport layer, a session layer, a presentation layer, and an application layer (not shown), above data link 114.

Universal data links 110 and 114, as well as PHY layers 112, 113, 116, and 117, are depicted in dashed lines in the figures herein to indicate that these layers are virtual layers instead of physical layers. For example, in some embodiments, a processor (not shown) of first communication device 102 executes instructions in the form of software or firmware stored in a memory (not shown) of first communication device 102 to implement universal data link 110 and PHY layers 112 and 113. As another example, in some embodiments, a processor (not shown) of second communication device 104 executes instructions in the form of software or firmware stored in a memory (not shown) of second communication device 104 to implement universal data link 114 and PHY layers 116 and 117.

Figure 22:
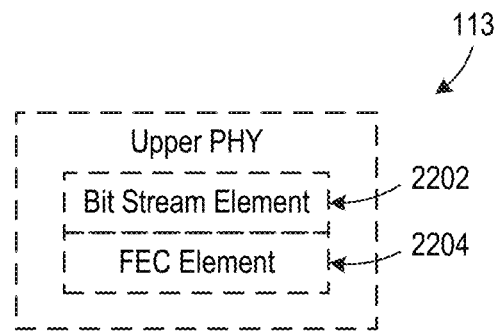
FIG. 22 is a schematic diagram illustrating an upper physical layer, according to an embodiment.
Figure 23:
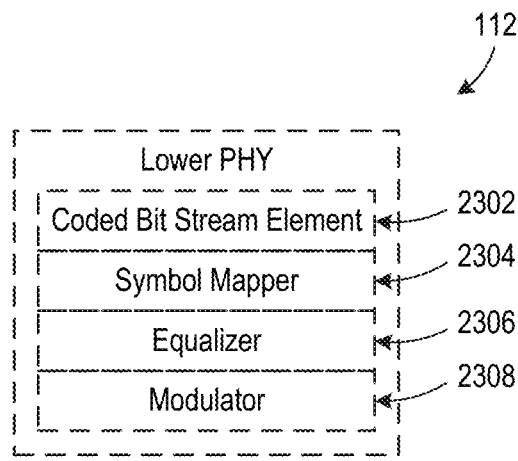
FIG. 23 is a schematic diagram illustrating a lower physical layer, according to an embodiment.

First communication device 102 is configured to obtain transmission entities 122, such as from a network layer internal to or external to communication device 102, and convert transmission entities 122 into physical data symbols 124. In particular, universal data link 110 controls conversion of transmission entities 122 into physical data symbols 124, and PHY layers 112 and 113 collectively control generation of a carrier signal (not shown) on communication medium 106(1) and modulation of the carrier signal such that the carrier signal is encoded with physical data symbols 124. FIG. 22 is a schematic diagram illustrating upper PHY layer 113, and FIG. 23 is a schematic diagram illustrating lower PHY layer 112. Upper PHY layer 113 includes a bit stream element 2202 and a FEC element 2204. Lower PHY layer 112 includes a coded bit stream element 2302, a symbol mapper 2304, an equalizer 2306, and a modulator 2308. Bit stream element 2202 converts transmission entities into physical layer bit streams, and FEC element 2204 performs FEC on the physical layer bit streams. Coded bit stream element 2302 codes a bit stream received from upper PHY layer 113. Symbol mapper 2304 maps the coded bit stream to the physical data symbols 124, and equalizer 2306 performs equalization of the physical data symbols 124. Modulator 2308 modulates the carrier signal such that the carrier signal is encoded with physical data symbols 124. Accordingly, FEC occurs in upper PHY layer 113, and FEC does not occur in lower PHY layer 112.

Second communication device 104 is configured to receive physical data symbols 124 from communication medium 106(N) and convert received physical data symbols 124 into transmission entities 126. In particular, PHY layers 116 and 117 collectively control demodulation of a carrier signal received from communication medium 106(N) to obtain data symbols 124, and universal data link 114 controls conversion of received physical data symbols 124 into transmission entities 126. Lower PHY layer 116 includes a coded bit stream element, a symbol mapper, an equalizer, and a modulator, analogous to those of lower PHY layer 112. Upper PHY layer 117 includes a bit stream element and a FEC element analogous to those of upper PHY layer 113. Transmission entities 126 include at least some of the same payload as transmission entities 122, but transmission entities 126 need not be identical to transmission entities 122. Data links 110 and 114 are "universal" in the sense that they control transmission of physical data symbols over multiple different communication media 106 types, as discussed below.

In this document, the term "transmission entity" refers to a unit of data for traveling along a network path, where the unit of data includes a header and a payload. For example, a transmission entity 122 may include a header with routing information and payload containing data to be transmitted by network 100. Examples of a transmission entities include, but are not limited to, data frames, data packets, data segments, and similar data elements known to those of ordinary skill in the art. Additionally, in this document, the term "physical data symbol" refers to the state or condition of a communication medium that persists for a fixed period of time and represents one or more bits of data. For example, a physical data symbol 124 may be an electrical, optical, or electromagnetic (including in the radio frequency domain) burst or continuous signal on a communication medium 106.

In some embodiments, first communication device 102 internally generates transmission entities 122, while in some other embodiments, first communication device 102 receives transmission entities 122 from an external source (not shown). Furthermore, first communication device 102 optionally performs functions in addition to converting transmission entities into physical data symbols, and vice versa. In some embodiments, first communication device 102 is one or more of a telecommunication network switch (e.g., a long-term evolution (LTE) wireless communication network switch, a fifth generation (5G) wireless communication network switch, or a sixth generation (6G) wireless communication network switch), a modem termination system (MTS) (e.g., a cable modem termination system (CMTS) or an evolved modem termination system (EMTS)), a concentrator, a digital subscriber line access multiplexer (DSLAM), a modem, and an optical network termination device.

In some embodiments, second communication device 104 internally uses transmission entities 126, while in some other embodiments, second communication device 104 transmits transmission entities 126 to an external device or system (not shown). Furthermore, second communication device 104 optionally performs functions in addition to converting transmission entities into physical data symbols, and vice versa. In some embodiments, second communication device 104 is one or more of a modem, an optical network termination device, a wireless communication base station (e.g., a Bluetooth wireless communication base station, a LTE wireless communication base station, 5G wireless communication base station, a 5G New Radio (5G NR) wireless communication base station, 6G wireless communication base station, or a scheduled Wi-Fi base station), a wireless access point, user equipment (e.g., a mobile telephone, a tablet computer, or a personal computer), and an Internet-of-Things (IoT) device. In particular embodiments, second communication device 104 supports multiple end points or clients, e.g., up 1, 4, 8, or 32 end points or clients, such as by performing network address translation (NAT).

Communication media 106 communicatively couple first communication device 102 and second communication device 104. In particular, communication media 106 receive physical data symbols 124 from first communication device 102 and transmit physical data symbols 124 to second communication device 104. Each communication medium 106 includes, for example, a fiber optic cable communication medium, a coaxial cable communication medium, a twisted-pair cable communication medium, or a wireless communication medium (e.g., a LTE wireless communication medium, a 5G wireless communication medium, a 6G wireless communication medium, or a scheduled Wi-Fi communication medium). In particular embodiments, at least two of the N communication mediums 106 are different types of communication mediums 106, such as discussed below with respect to FIGS. 3-9. Additionally, in some embodiments, at least two of the N communication mediums 106 have different respective maximum communication bandwidths. In embodiments where communication media 106 include cables, each communication medium 106 may include a single cable or multiple cables, e.g., multiple parallel-coupled cables. Additionally, in embodiments where communication media 106 include a wireless communication medium, the wireless communication medium may include a single pair of wireless transducers or multiple pairs of wireless transducers. Furthermore, in some embodiments, one or more of communication media 106 are configured to transmit physical data symbols 124 in a manner which simultaneously carries data for two or more communications. For example, in some embodiments, communication media 106 are configured to implement one or more of a orthogonal frequency division multiplexing (OFDM) technique, a wave duplex multiplexing (DM) technique, and a coherent optics technique to simultaneously transmit two or more communications.

Adjacent communication mediums 106 are communicatively coupled by a respective PHY translator 108. For example, communication medium 106(1) is communicatively coupled with communication medium 106(2) by PHY translator 108(1), and communication medium 106(N-1) is communicatively coupled with communication medium 106(N) by PHY translator 108(N-1). Each PHY translator 108 translates physical data symbols received from one of its respective communication mediums 106 for transmission through the other of its respective communication mediums 106. For example, PHY translator 108(1) translates physical data symbols 124 received from communication medium 106(1) for transmission through communication medium 106(2), and PHY translator 108(N-1) translates physical data symbols 124 received from communication medium 106(N-1) for transmission through communication medium 106(N).

PHY translators 108 may interface communication mediums 106 having different modulation schemes (MSs), different operating optical characteristics, different electrical characteristics, and/or different radio characteristics. For example, in an embodiment, communication medium 106(1) uses a first MS, and communication medium 106(2) uses a second MS. In this embodiment, PHY translator 108(1) demodulates a carrier signal received from communication medium 106(1) into data symbols 124 using the first MS, and PHY translator 108(1) then modulates the data symbols 124 onto a carrier signal being transmitted through communication medium 106(2) using the second MS. As another example, in an embodiment, communication medium 106(N-1) includes a fiber optic cable communication medium, and communication medium 106(N) includes a wireless communication medium. In this embodiment, PHY translator 108(N-1) demodulates an optical carrier signal received from communication medium 106(N) into physical data symbols 124, and PHY translator 108(N-1) then modulates physical data symbols 124 onto a radio-frequency carrier signal being transmitted through communication medium 106(N).

In some embodiments, PHY translators 108 operate according to a common system clock, e.g., according to the same clock signal as first communication device 102 and/or second communication device 104. In some other embodiments, all clocks of network 100 are derived from a lowest common denominator clock. For example, in one embodiment, one or more devices of network 100 operate at a 200 MHz clock signal, and one or more devices of network 100 operate at a multiple of the 200 MHz clock signal, e.g., at a 800 MHz clock signal, a 1.6 GHz clock signal, and/or 3.2 GHz clock signal, derived from the 200 MHz clock signal.

In particular embodiments, such as illustrated in FIG. 1, PHY translators 108 implement lower PHY layers analogous to those of FIG. 23, but PHY translators 108 do not implement upper PHY layers analogous to those of FIG. 22. Lower PHY layers of PHY translators 108 are depicted in dashed lines in the figures herein to indicate that these layers are virtual layers instead of physical layers. For example, in some embodiments, a processor (not shown) of PHY translator 108(1) executes instructions in the form of software or firmware stored in a memory (not shown) of PHY translator 108(1) to implement lower PHY 1 layer and lower PHY 2 layer.

In certain embodiments, PHY translators 108 are limited to performing modulation and demodulation, while in some other embodiments, PHY translators 108 perform additional functions. For example, in particular embodiments, one or more PHY translators 108 perform equalization to correct for distortion in a carrier signal received from a respective communication medium 106. In these embodiments, equalization is optionally performed dynamically, e.g., the type of equalization performed varies according to application of network 100. For example, a first type of equalization may be performed when network 100 transmits a first type of data, and a second type of equalization may be performed when network 100 transmits a second type of data.

Figure 2:
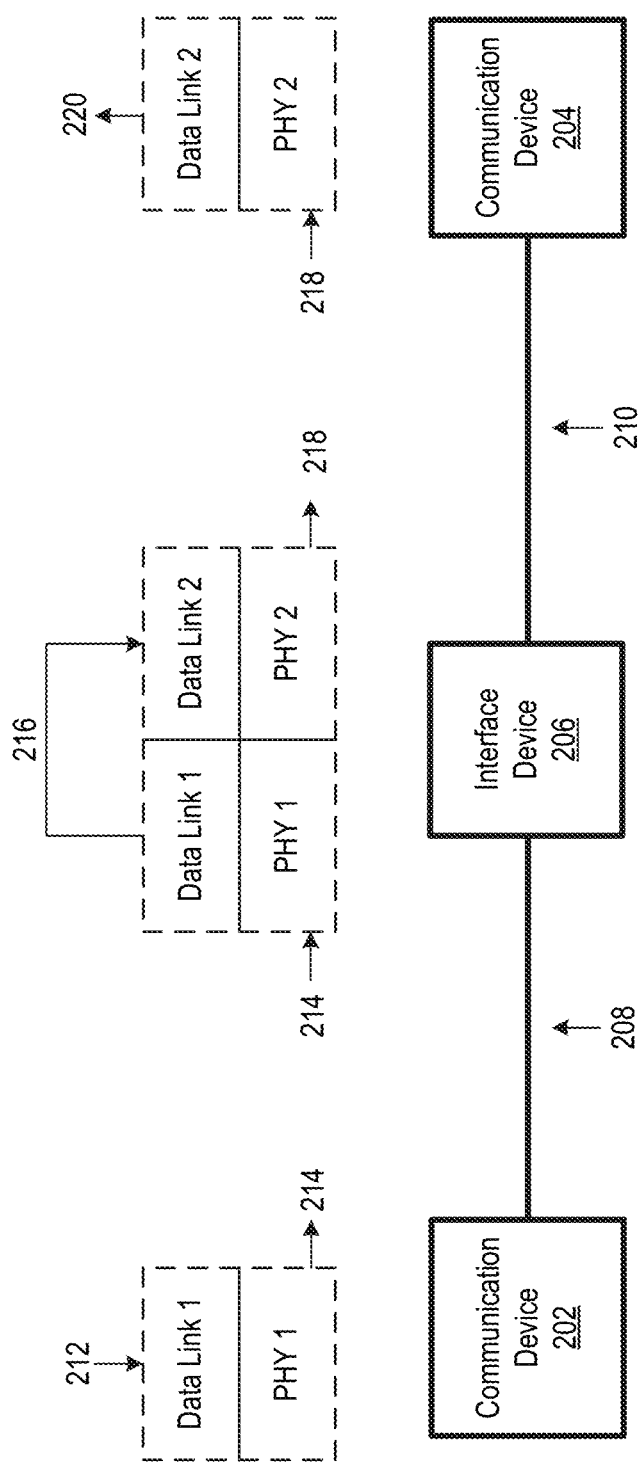
FIG. 2 is a schematic diagram illustrating a network implementing conventional data links, according to an embodiment.

Importantly, PHY translators 108 do not convert physical data symbols 124 into transmission entities when translating the physical layer data symbols from one communication medium 106 to another communication medium 106. To help appreciate this point, consider FIG. 2, which is a schematic diagram illustrating a network 200 implementing conventional data links. Network 200 includes a first communication device 202, a second communication device 204, an interface device 206, a first communication medium 208, and a second communication medium 210. First communication device 202 converts transmission entities 212 into physical data symbols 214, and first communication medium 208 transmits physical data symbols 214 to interface device 206. Interface device 206 converts physical data symbols 214 received from first communication medium 208, equalizes the physical data symbols and demaps them into coded bitstreams, decodes the FEC to recover original bit stream that is converted into transmission entities. Interface device 206 takes transmission entities and conducts MAC layer processing (i.e. switching), i.e., interface device 206 converts the transmission entities to physical layer bit streams, FEC encodes the bitstreams into longer coded bitstreams, then maps coded bitstreams into a different set of data symbols 218 for transmission through second communication medium 210. Second communication medium 210 transmits physical data symbols 218 to second communication device 204. Second communication device 204 equalizes the physical data symbols and demaps them to recover coded bitstream, decodes the FEC recover the original uncoded physical layer bitstream into transmission entities 220. Thus, interface device 206 converts physical data symbols into transmission entities and then converts the transmission entities back into physical data symbols, to interface first communication medium 208 with second communication medium 210. Consequently, data travels through at least two OSI layers when transitioning between first communication medium 208 and second communication medium 210. This may introduce latency, jitter, and errors in the communication from first communication device 202 to second communication device 204.

Referring again to FIG. 1, PHY translators 108 do not convert physical data symbols 124 into transmission entities when translating the data symbols from one communication medium 106 to another communication medium 106. PHY translator 108(1), for example, converts physical data symbols 124 received from first communication medium 106, equalizes the physical data symbols and demaps them into coded bitstreams, and PHY translator 108(1) then maps coded bitstreams into a different set of data symbols 124 for transmission through second communication medium 106. The other PHY translators 108 operate in an analogous fashion. Consequently, in contrast to network 200 of FIG. 2, data does not travel through multiple OSI layers when transitioning between communication media 106. Instead, universal data links 110 and 114 control transmission of physical data symbols over multiple different communication media 106 types without requiring intervening data links, such as the data links of interface device 206 of FIG. 2. The transmission stays below the FEC coding and decoding process. There is no FEC decoding at PHY translators 108, in particular embodiments. The coded bit streams are passed from one communication medium 106 to the next. FEC coding and decoding takes place only at the end-points, e.g. at first communication device 102 and second communication device 104. Applicant has found that these features of network 100 may achieve significant advantages.

For example, use of universal data links 110 and 114 eliminates the need for conversion between physical data symbols and transmission entities when transitioning between communication mediums 106, thereby promoting fast transfer of data by network 100. Indeed, in particular embodiments, there is little buffering of physical data symbols 124, or even no buffering of physical data symbols 124, when translating the physical data symbols between communication mediums 106. Consequently, certain embodiments of network 100 may achieve significantly lower data transmission latency than networks which implement conventional data links. Additionally, time required to convert between physical data symbols and transmission entities may vary depending on network operating conditions, resulting in non-deterministic latency and jitter in conventional networks, where jitter is variation in latency. Use of universal data links 110 and 114, however, eliminates such need for conversion between physical data symbols and transmission entities along communication media 106, as discussed above. Therefore, certain embodiments of network 100 may advantageously have deterministic latency and experience lower jitter than networks implementing conventional data links. Furthermore, in particular embodiments, use of universal data links 110 and 114 may promote network throughput and/or efficient bandwidth usage.

Furthermore, use of universal data links 110 and 114 enables use of a single data link pair for transmission across multiple communication mediums 106. Therefore, a single data transmission protocol can be used to transmit data across all communication media 106, which promotes low latency. Possible examples of a single data transmission protocol include, but are not limited to, a LTE protocol, a data over cable service interface specification (DOCSIS) protocol, a scheduled Wi-Fi protocol, a 5G wireless transmission protocol, and a 6G wireless transmission protocol. Additionally, use of a single data transmission protocol may simplify network management and reduce or eliminate the need for proprietary data communication protocols. Moreover, in certain embodiments, universal data links 110 and 114 are transport medium agnostic, or stated differently, certain embodiments of universal data links 110 and 114 can be used with essentially any type of communication medium 106, as long as requisite PHY translators 108 are available, which promotes ease of network design, ease of network upgrading, and ease of network component procurement.

Furthermore, in certain embodiments, PHY translators 108 have limited functionality, e.g., in some embodiments, PHY translators 108 merely perform modulation/demodulation with optional equalization. As a result, use of universal data links 110 and 114 helps reduce complexity of equipment in the "field", i.e. equipment along communication media 106. Therefore, network 100 may be simpler to build, lower in cost, and/or easier to operate than networks implementing conventional data links. Additionally, the potential relative simplicity of PHY translators 108 helps enable centralized control and/or monitoring of network 100, since the majority of data processing may occur at endpoints of network 100, instead of along communication media 106.

In an embodiment, physical data symbols may be transmitted through each communication medium 106 at a common data transmission rate. Consequently, communication bandwidth of network 100 will be limited to the maximum communication bandwidth of whichever communication medium 106 has a lowest maximum communication bandwidth. For example, if communication medium 106(2) has a lowest maximum communication bandwidth of all communication mediums 106, communication bandwidth of network 100 cannot exceed the maximum communication bandwidth of communication media 106(2). However, advances in communication media technology have resulted in significant increases in communication media bandwidth, and further bandwidth advances are anticipated in the future. Therefore, limitations in communication bandwidth of communication media 106 may not be of significant consequence in network 100. In alternative embodiments, physical data symbols may be transmitted through each communication medium 106 at data transmission rate optimized for that media, data type, Quality of Service (QoS), etc. . . .

Figure 21:
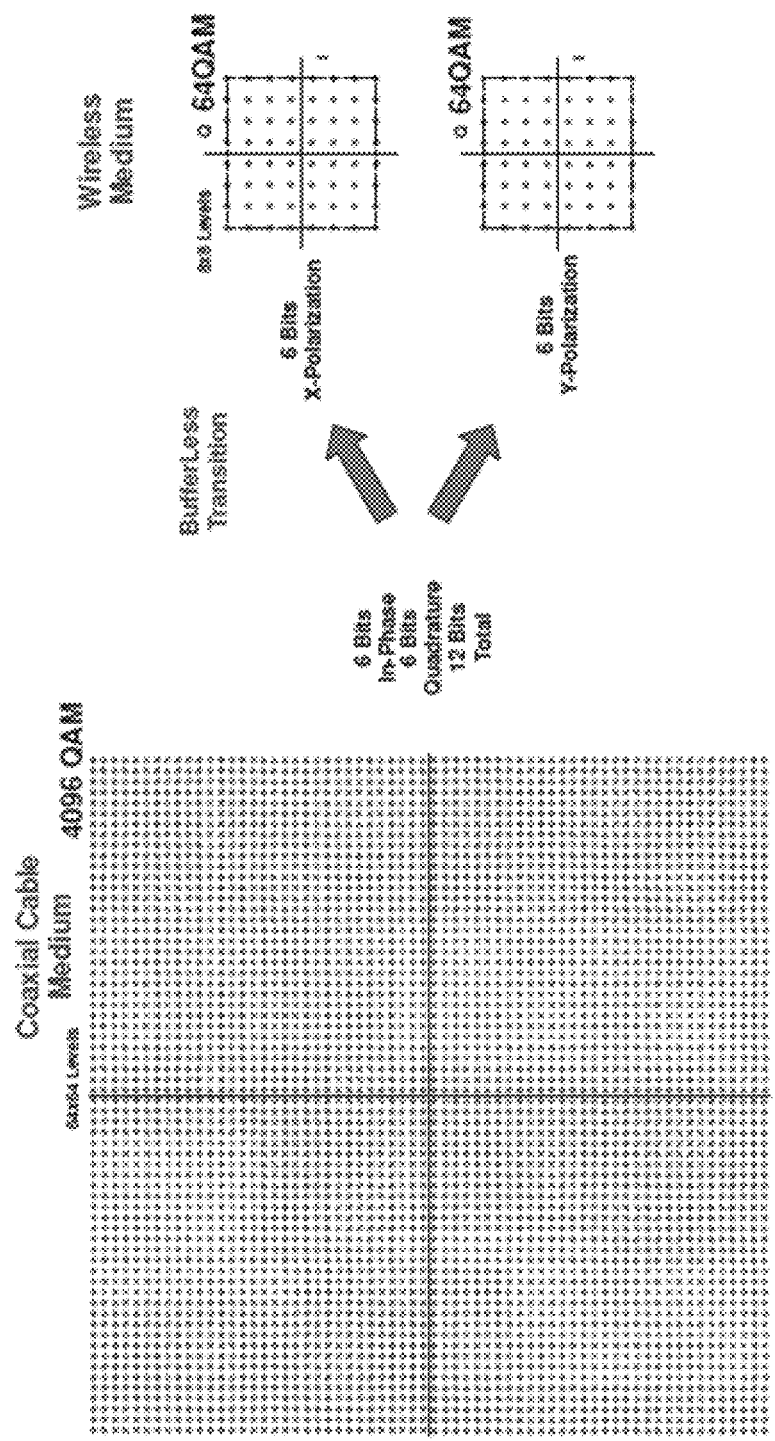
FIG. 21 is a schematic diagram illustrating one example of a physical-layer translator translating physical data symbols from a coaxial cable communication medium to a wireless communication medium, according to an embodiment.

In some embodiments, network 100 is configured such that two or more communication media 106 have an equal channel capacity or a predetermined relationship between channel capacity. For example, in particular embodiments, network 100 is configured such that two or more communication media 106 have a common channel capacity. It should be appreciated that common channel capacity can be achieved without necessarily having a common bandwidth. For instance, TABLE 1 below shows one example of how network 100 could be configured so that channels of two or more different communication mediums 106 have a common channel capacity. In TABLE 1, "Transport Medium" refers to communication medium 106 type, e.g., a fiber optic cable communication medium (Fiber), a coaxial cable communication medium (Coax), or a wireless communication medium (Wireless). In the example of TABLE 1, common channel capacity is achieved even though communication media 106 do not necessarily have a common bandwidth. FIG. 21 is a schematic diagram illustrating one example of a PHY translator 108 embodiment transmitting physical data symbols 124 from a coaxial cable communication medium to a 3.5 GHz wireless communication medium according to the example of TABLE 1.

Referring again to FIG. 1, in some embodiments, network 100 is configured to support a 200 MHz, 1 bit per symbol, no polarity diversity, no multiple-input, multiple-output (MIMO), control channel. In particular embodiments, network 100 is configured to support carrier aggregation, e.g., by mapping from one center frequency to another using equivalent channels. In some embodiments, network 100 is configured to implement a per-channel time-division multiple access (TMDA) scheme to achieve wide bandwidth which matches that of optical and radio-frequency media.

Network 100 is capable of two-way transmission. Specifically, not only is network 100 cable of transmitting data from first communication device 102 to second communication device 104, network 100 is also capable of transmitting data from second communication device 104 to first communication device 102. In particular, second communication device 104 is configured to obtain transmission entities 128, such as from a network layer internal to or external to second communication device 104, and convert transmission entities 128 into data symbols 130. In particular, universal data link 114 controls conversion of transmission entities 128 into physical data symbols 130, and PHY layers 116 and 117 collectively control generation of a carrier signal (not shown) on communication medium 106 (N) and modulation of the carrier signal such that the carrier signal is encoded with physical data symbols 130. In some embodiments, second communication device 104 internally generates transmission entities 128, while in some other embodiments, second communication device 104 receives transmission entities 128 from an external source (not shown).

Communication media 106 receive physical data symbols 130 from second communication device 104 and transmit physical data symbols 130 to first communication device 102. Each PHY translator 108 translates physical data symbols 130 received from one of its respective communication mediums 106 for transmission through the other of its respective communication mediums 106 in a manner like that discussed above with respect to physical data symbols 124. For example, PHY translators 108 do not convert physical data symbols 130 into transmission entities when translating the physical data symbols from one communication medium 106 to another communication medium 106.

First communication device 102 is configured to receive physical data symbols 130 from communication medium 106(1) and convert received physical data symbols 130 into transmission entities 132. In particular, PHY layers 112 and 113 collectively control demodulation of a carrier signal received from communication medium 106(1) to obtain physical data symbols 130, and universal data link 110 controls conversion of received physical data symbols 130 into transmission entities 132. Transmission entities 132

TABLE 1

| Transport Medium | Frequency/ Range | Modulation | Total Spectrum Avail (GHz) | Total Capacity (Gbps) | Channel Capacity (Gbps) | Channel Spectrum Used (MHz) | Total Number of Channels | Bits per Symbol | Number of Polarizations | Symbol Rate Ratio (200 MHz Reference) |
|---|---|---|---|---|---|---|---|---|---|---|
| Coax | Baseband | 4096 QAM | 4 | 48 | 2.4 | 200 | 20 | 12 | 1 | 1 |
| Wireless | 3.5 GHz | 64 QAM | 0.6 | 7.2 | 2.4 | 200 | 3 | 6 | 2 | 1 |
| Wireless | 6 GHz | 64 QAM | 1 | 12 | 2.4 | 200 | 5 | 6 | 2 | 1 |
| Wireless | 28 GHz | 8 QAM | 1 | 6 | 2.4 | 400 | 2 | 3 | 2 | 2 |
| Wireless | 60 GHz | QPSK | 8 | 32 | 2.4 | 600 | 13 | 2 | 2 | 3 |
| Fiber | Baseband | NRZ-OOK | 10 | 10 | 2.4 | 2400 | 4 | 1 | 1 | 12 |
| Fiber | Baseband | QPSK | 25 | 100 | 2.4 | 600 | 41 | 2 | 2 | 3 | include at least some of the same payload as transmission entities 128, but transmission entities 132 need not be identical to transmission entities 128. In some embodiments, first communication device 102 internally uses transmission entities 132, while in some other embodiments, first communication device 102 transmits transmission entities 132 to an external device or system (not shown).

In certain alternate embodiments, network 100 is only capable of one-way data transmission, e.g., network 100 is only capable of transmitting data from first communication device 102 to second communication device 104, or vice versa. In these alternate embodiments, communication media 106 need only be capable of one-way data transmission. Additionally, in these alternate embodiments, PHY translators 108 need only be capable of one-way translation.

As discussed above, some embodiments of network 100 are capable of performing FEC, which is also known as channel coding, at end points of communication media 106, thereby potentially eliminating the need for FEC along communication media 106. In these embodiments, first communication device generates transmission entities 122 such that each transmission entity 122 includes an error-correcting code, and second communication device 104 corrects any transmission errors that occurred during transmission of data symbols across communication media 106 using the error correcting codes. The error correcting codes, for example, encode data in a redundant manner to potentially enable transmission errors to be corrected without retransmitting data through communication media 106. The type of FEC is selected, for example, to adequately correct errors of a most error-prone instance of communication mediums 106. In some embodiments, the FEC is dynamic, i.e., the type of FEC performed by first communication device 102 and second communication device 104 may vary depending on the application of network 100, e.g., depending on the type of data being transmitted by network 100. Certain embodiments of network 100 are also capable of performing FEC when transmitting data from second communication device 104 to first communication device 102.

It should be noted that network 100 is not limited to performing FEC at the end points of communication media 106. To the contrary, FEC could be performed along communication media 106, e.g., at one or more PHY translators 108, in addition to, or in place of, FEC at the end points of communication media 106.

Network 100 can include additional elements without departing from the scope hereof. For example, some embodiments include one or more relays, e.g., bufferless relays, communicatively coupling instances of communication media 106. Additionally, network 100 is not limited to particular applications but instead could be implemented in a variety of applications, including but not limited to backhaul applications, fronthaul applications, residential access applications, and/or commercial access applications.

Discussed below with respect to FIGS. 3-9 are several example embodiments of network 100. It should be appreciated, however, that network 100 is not limited to the examples of FIG. 3-9.

Figure 3:
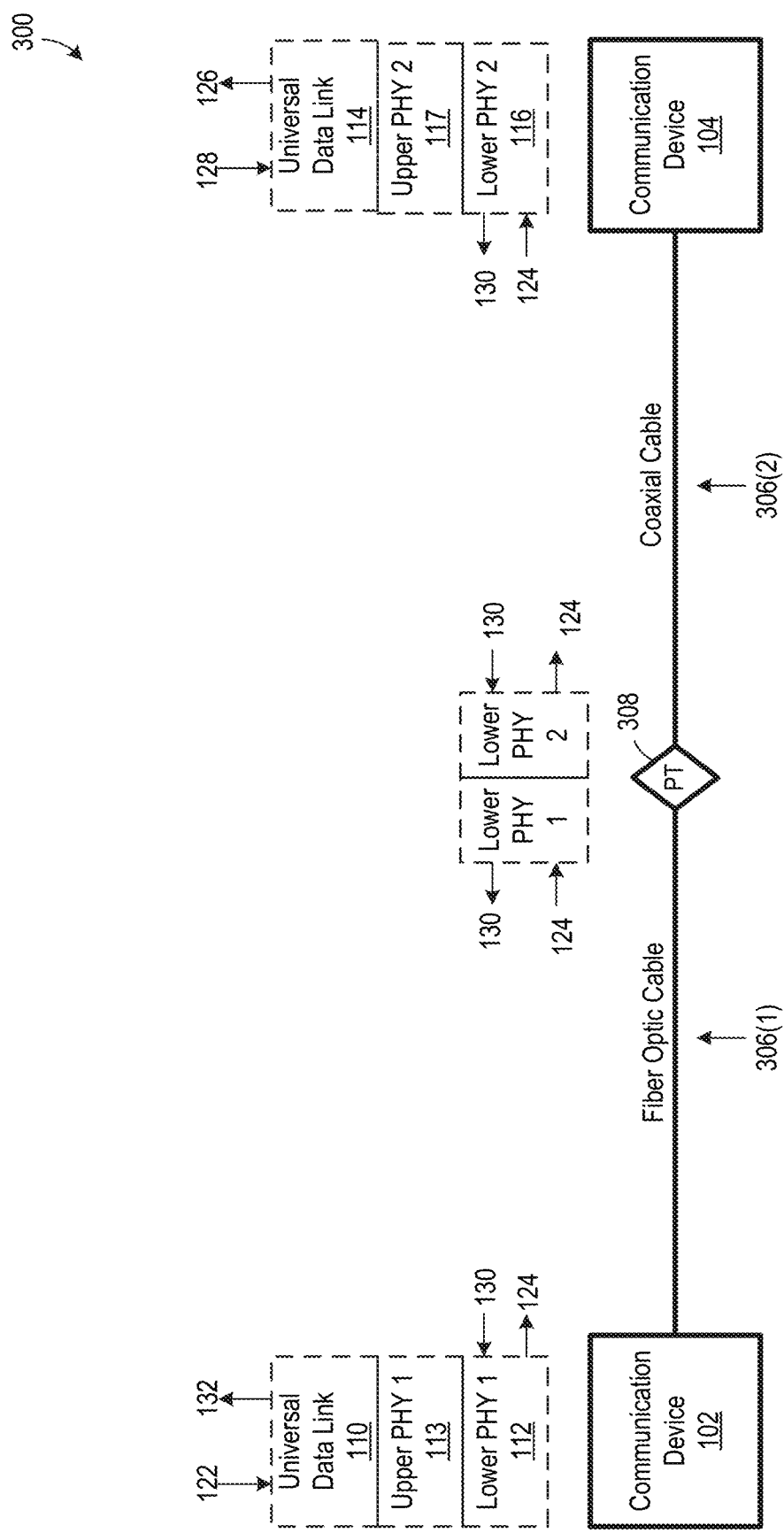
FIG. 3 is a schematic diagram illustrating a network implementing a universal data link and including a fiber optic cable communication medium and a coaxial cable communication medium, according to an embodiment.

FIG. 3 is a schematic diagram illustrating a network 300 which is an embodiment of network 100 where (a) communication media 106 is implemented with a fiber optic cable communication medium 306(1) and a coaxial cable communication medium 306(2) and (b) PHY translator 108(1) is implemented by a PHY translator 308. In some embodiments, PHY translator 308 is located at a tap or in a home, e.g., network 300 represents a fiber to the tap application or a fiber to the home application. Although each of the fiber optic cable and the coaxial cable is depicted as a single cable in FIG. 3, one or more of these cables could be implemented by multiple cables. PHY translator 308 is configured to translate physical data symbols 124 received from the fiber optic cable for transmission through the coaxial cable, and PHY translator 308 is further configured to translate physical data symbols 130 received from the coaxial cable for transmission through the fiber optic cable.

Figure 4:
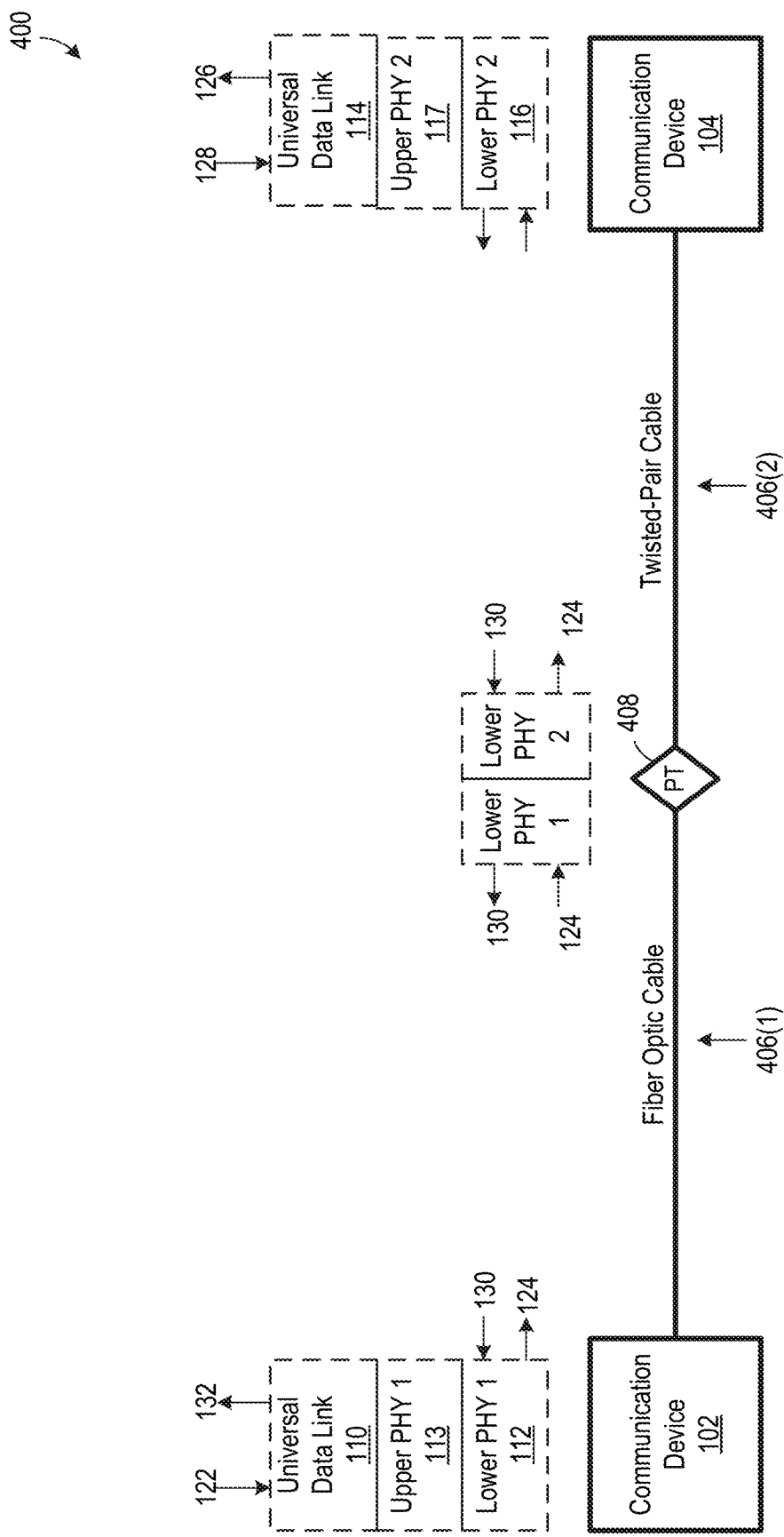
FIG. 4 is a schematic diagram illustrating a network implementing a universal data link and including a fiber optic cable communication medium and a twisted-pair cable communication medium, according to an embodiment.

FIG. 4 is a schematic diagram illustrating a network 400 which is an embodiment of network 100 where (a) communication media 106 is implemented with a fiber optic cable communication medium 406(1) and a twisted-pair cable communication medium 406(2) and (b) PHY translator 108(1) is implemented by a PHY translator 408. Although each of the fiber optic cable and the twisted pair cable is depicted as a single cable in FIG. 4, one or more of these cables could be implemented by multiple cables. PHY translator 408 is configured to translate physical data symbols 124 received from the fiber optic cable for transmission through the twisted-pair cable, and PHY translator 408 is further configured to translate physical data symbols 130 received from the twisted-pair cable for transmission through the fiber optic cable.

Figure 5:
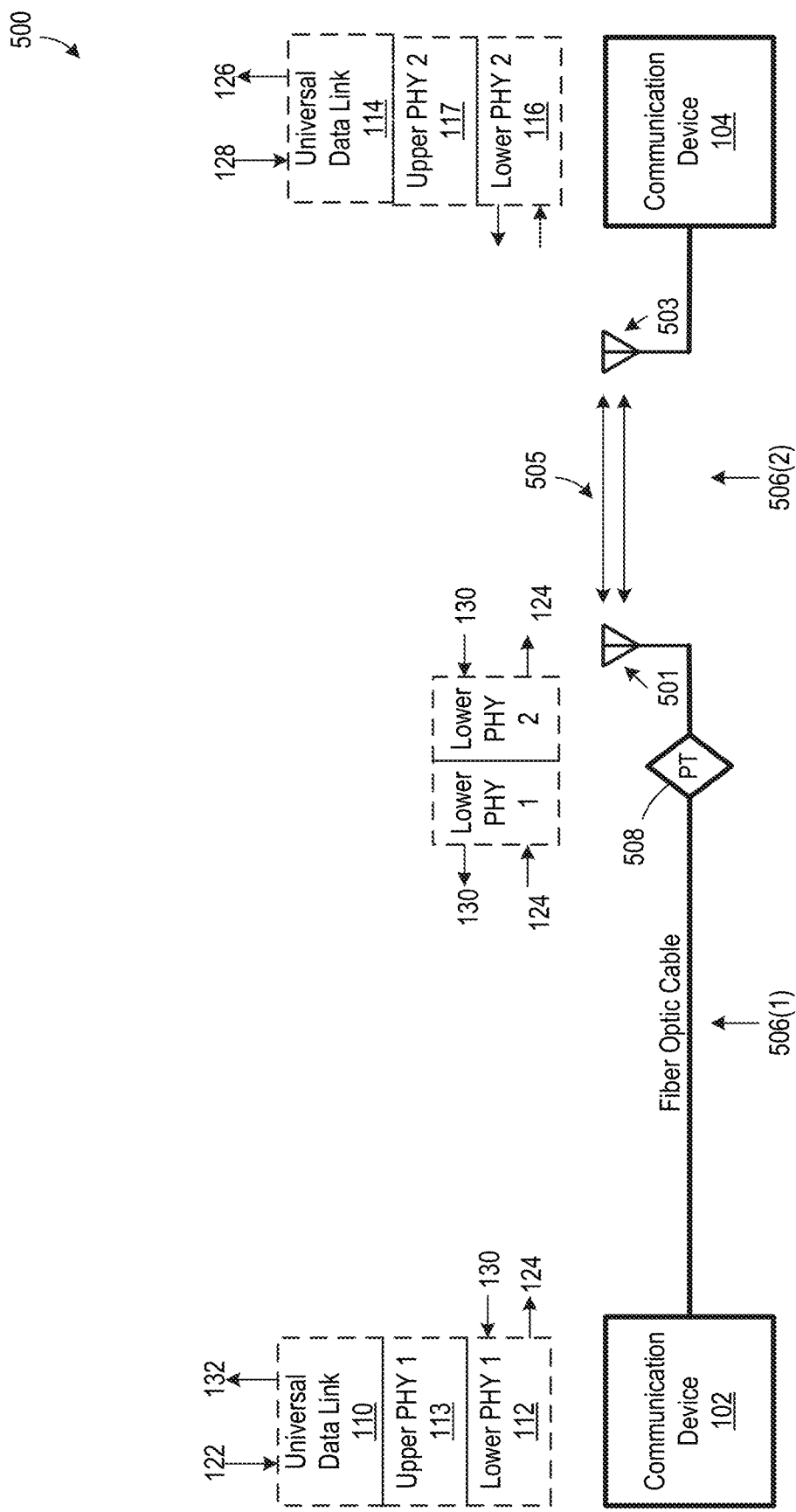
FIG. 5 is a schematic diagram illustrating a network implementing a universal data link and including a fiber optic cable communication medium and a wireless communication medium, according to an embodiment.

FIG. 5 is a schematic diagram illustrating a network 500 which is an embodiment of network 100 where (a) communication media 106 is implemented with a fiber optic cable communication medium 506(1) and a wireless communication medium 506(2) and (b) PHY translator 108(1) is implemented by a PHY translator 508. Although the fiber optic cable is depicted as a single cable in FIG. 5, the fiber optic cable could be implemented by multiple cables. Wireless communication medium 506(2) includes two transceivers 501 and 503 which wirelessly communicate via radio-frequency signals 505. Wireless communication medium 506(2) is for example, a LTE wireless communication medium, a 5G wireless communication medium, a 6G wireless communication medium, or a scheduled Wi-Fi communication medium. PHY translator 508 is configured to translate physical data symbols 124 received from the fiber optic cable for transmission through the wireless communication medium, and PHY translator 508 is further configured to translate physical data symbols 130 received from the wireless communication medium for transmission through the fiber optic cable.

Figure 6:
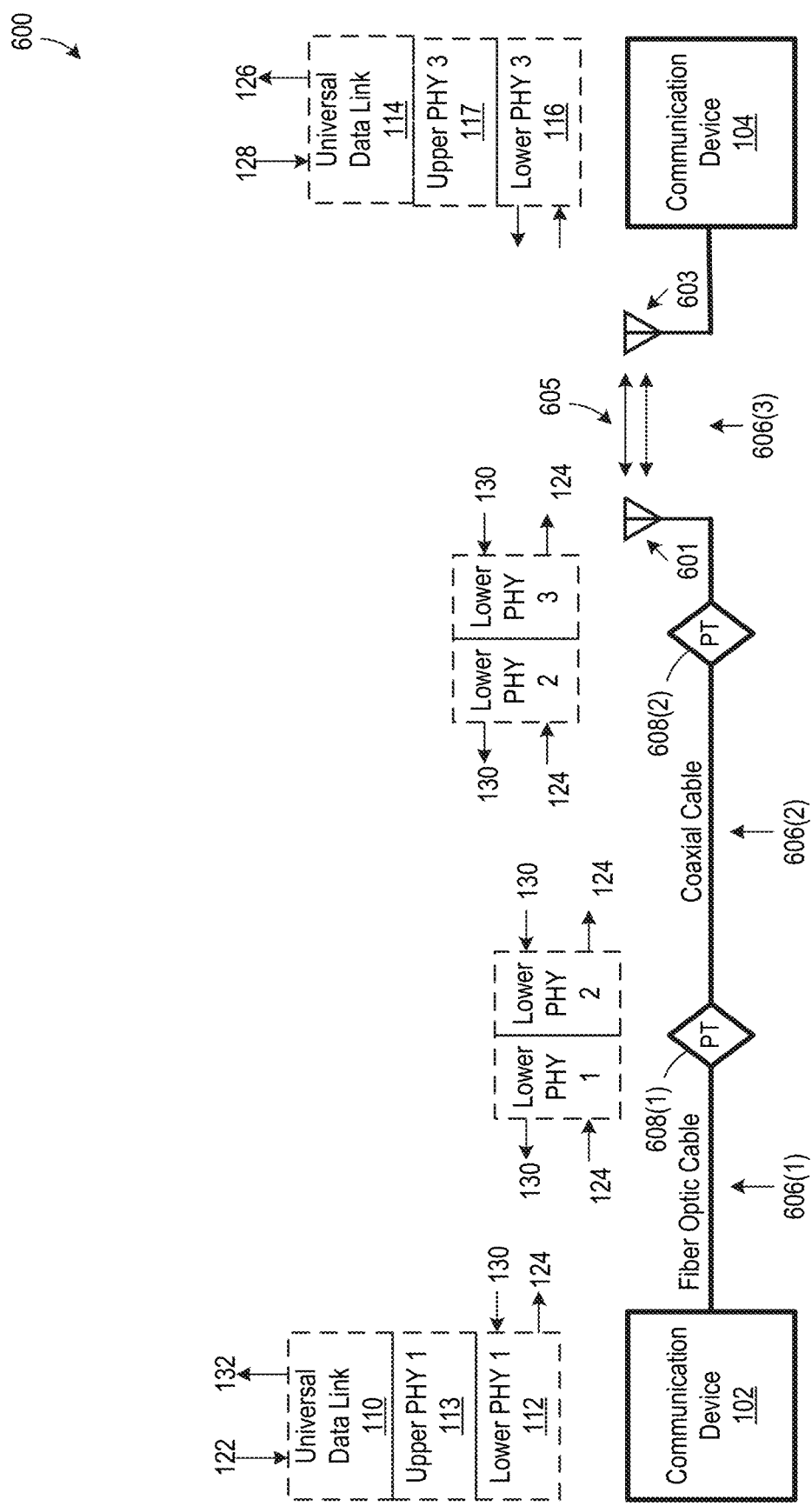
FIG. 6 is a schematic diagram illustrating a network implementing a universal data link and including a fiber optic cable communication medium, a coaxial cable communication medium, and a wireless communication medium, according to an embodiment.

FIG. 6 is a schematic diagram illustrating a network 600 which is an embodiment of network 100 where (a) communication media 106 is implemented with a fiber optic cable communication medium 606(1), a coaxial cable communication medium 606(2), and a wireless communication medium 606(3), and (b) PHY translators 108(1) and 108(2) are implemented by a PHY translator 608(1) and a PHY translator 608(2), respectively. Although the fiber optic cable and the coaxial cable are each depicted as a single cable in FIG. 6, one or more of these cables could be implemented by multiple cables. Wireless communication medium 606(3) includes two transceivers 601 and 603 which wirelessly communicate via radio-frequency signals 605. Wireless communication medium 606(3) is for example, a LTE wireless communication medium, a 5G wireless communication medium, a 6G wireless communication medium, or a scheduled WiFi communication medium. PHY translator 608(1) is configured to translate physical data symbols 124 received from the fiber optic cable for transmission through the coaxial cable communication medium, and PHY translator 608(1) is further configured to translate physical data symbols 130 received from the coaxial cable communication medium for transmission through the fiber optic cable communication medium. PHY translator 608(2) is configured to translate physical data symbols 124 received from the coaxial cable communication medium for transmission through the wireless communication medium, and PHY translator 608(2) is further configured to translate physical data symbols 130 received from the wireless communication medium for transmission through the coaxial cable communication medium.

Figure 7:
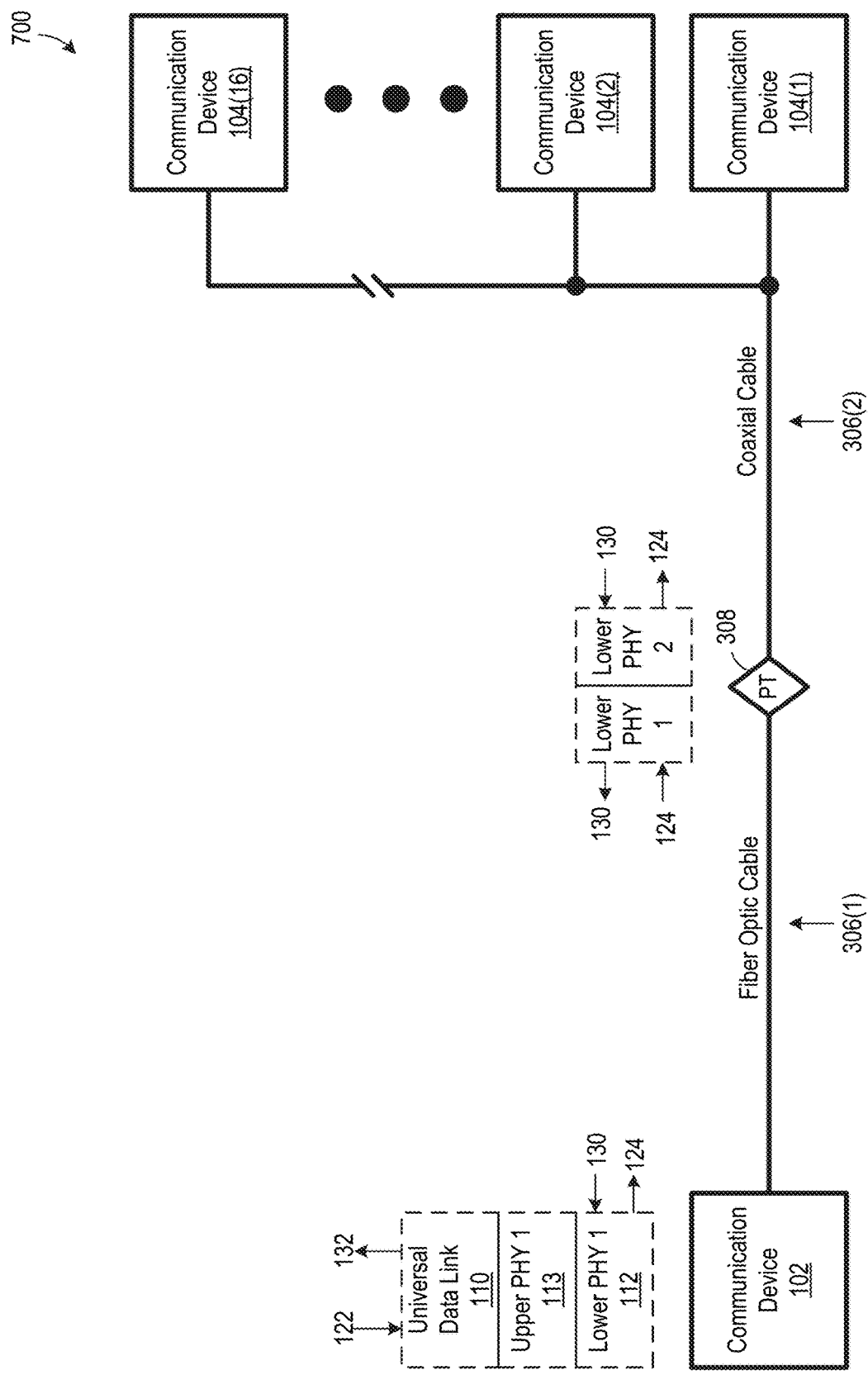
FIG. 7 is a schematic diagram illustrating a network implementing a universal data link and including a fiber optic cable communication medium, a coaxial cable communication medium, and multiple second communication devices, according to an embodiment

Although the networks discussed above include two communication devices, the networks could be scaled to include three or more communication devices implementing universal data links. For example, FIG. 7 is a schematic diagram illustrating a network 700, which is similar to network 300 of FIG. 3, but including a plurality of second communication devices 104 communicatively coupled with coaxial cable communication medium 306(2). Although FIG. 7 shows network 700 as including 16 second communication devices 104, network 700 could include a different number of second communication devices 104 without departing from the scope hereof.

Each second communication device 104 operates in the same manner in network 700 as in networks 100 and 300. For example, each second communication device 104 is configured to receive physical data symbols 124 from coaxial cable communication medium 306(2) and convert received physical data symbols 124 into transmission entities 126. Additionally, each second communication device 104 is configured to obtain transmission entities 128 and convert transmission entities 128 into physical data symbols 130. Each second communication device 104 implements a respective universal data link 114 and a respective PHY layer 116 (not shown in FIG. 7).

In some embodiments, first communication device 102 is configured to simultaneously send physical data symbols 124 to each second communication device 104, such as to broadcast data to all second communication devices 104 (multipoint communication). In some other embodiments, first communication device 102 is configured to send physical data symbols 124 to only one second communication device 104, or to only a subset of second communication devices 104, at a given time, such as for selective communication with a given second communication device 104 (point to point communication). In other embodiments, first communication device 102 is configured to support both simultaneous broadcast to second communication devices 104 and selective communication with a subset of second communication devices 104.

Additionally, in some embodiments, first communication device 102 is further configured to support a plurality of data transmission protocols. In these embodiments, first communication device 102 is optionally further configured to (a) sense a data transmission protocol of each second communication device 104 and (b) communicate with each second communication device 104 using its respective data transmission protocol. For example, assume that in a certain embodiment second communication device 104(1) uses a data transmission protocol A and second communication device 104(2) uses a data transmission protocol B. In particular embodiments, first communication device 102 is configured to sense that second communication devices 104(1) and 104(2) use data transmission protocols A and B, respectively, and first communication device 102 is configured to communicate with second communication devices 104(1) and 104(2) using data transmission protocols A and B, respectively.

Figure 8:
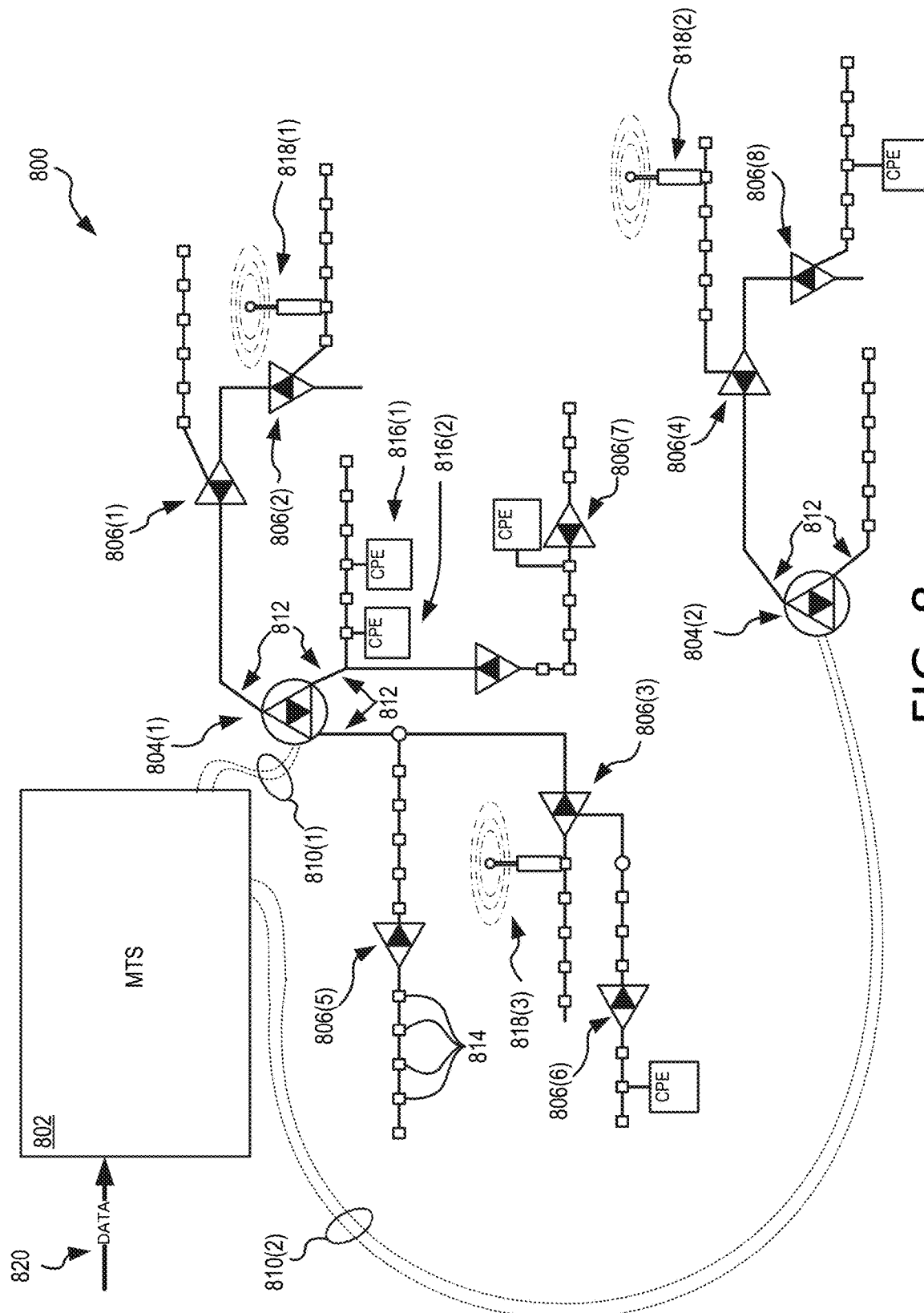
FIG. 8 is a schematic diagram illustrating a cable television network implementing a universal data link, according to an embodiment.

FIG. 8 illustrates another example of a network including a plurality of communication devices. Specifically, FIG. 8 is a schematic diagram illustrating a cable television network 800 implementing a universal data link. Network 800 includes a MTS 802, PHY translators 804, amplifiers 806, fiber optic communication mediums 810, coaxial cable communication mediums 812, coaxial cable taps 814, customer-premises equipment (CPE) 816, and wireless base stations 818. Only some instances of coaxial cable taps 814 and CPE 816 are labeled in FIG. 8 to promote illustrative clarity. Fiber optic communication mediums 810 communicatively couple PHY translators 804 with MTS 802, and coaxial cable communication mediums 812 communicatively couple PHY translators 804 with coaxial cable taps 814.

MTS 802 receives data 820 from an external device (not shown), and MTS 802 generates physical data symbols from data 820 for transmission to clients on network 800, e.g., for transmission to clients in the form CPE 816 and wireless base stations 818. MTS 802 also receives physical data symbols from network clients, and MTS implements a universal data link. Accordingly, MTS 802 is analogous to first communication device 102 of FIGS. 1 and 3-7. Fiber optic communication mediums 810 and coaxial cable communication mediums 812 collectively transfer physical data symbols between MTS 802 and network clients, and therefore, fiber optic communication mediums 810 and coaxial cable communication mediums 812 are analogous to communication media 106 of FIGS. 1 and 3-7. PHY translators 804 translate physical data symbols received from fiber optic communication mediums 810 for transmission through coaxial cable communication mediums 812, and PHY translators 804 further translate physical data symbols received from coaxial cable communication mediums 812 for transmission through fiber optic communication mediums 810. Thus, each PHY translator 804 is analogous to PHY translator 308 of FIG. 3. Amplifiers 806 amplify radio-frequency carrier symbols, which are encoded with physical data symbols, to help ensure integrity of the radio-frequency carrier signals at network clients.

Each coaxial cable tap 814 serves as a point for coupling a respective network client, e.g., a CPE 816 instance or a wireless base station 818, to a coaxial cable communication medium 812. While many coaxial cable taps 814 are shown in FIG. 8 without a respective network client coupled thereto to promote illustrative clarity, it is anticipated that in many embodiments of network 800, a respective network client would be coupled to the majority of coaxial cable taps 814.

Each CPE 816 instance includes, for example, a cable modem or a cable television set-top box. Additional devices, such as computers and mobile telephones, may in-turn be communicatively coupled to each CPE 816. Each wireless base station 818 is, for example, a LTE wireless base station, a 5G wireless base station, a 6G wireless base station, or a scheduled WiFi wireless base station. In particular embodiments, each CPE 816 instance and each wireless base station 818 implements a respective universal data link, and therefore, each CPE 816 instance and each wireless base station 818 is analogous to a second communication device 104. Accordingly, in these embodiments, physical data symbols are transmitted between (a) MTS 802 and (b) CPE 816 and wireless base stations 818 without being converted into transmission entities when transitioning between fiber optic communication mediums 810 and coaxial cable communication mediums 812. For example, data symbols are transmitted between MTS 802 and CPE 816(1) without being converted to transmission entities when transitioning between fiber optic communication mediums 810 and coaxial cable communication mediums 812. As another example, data symbols are transmitted between MTS 802 and wireless base station 818(1) without being converted to transmission entities when transitioning between fiber optic communication mediums 810 and coaxial cable communication mediums 812.

Figure 9:
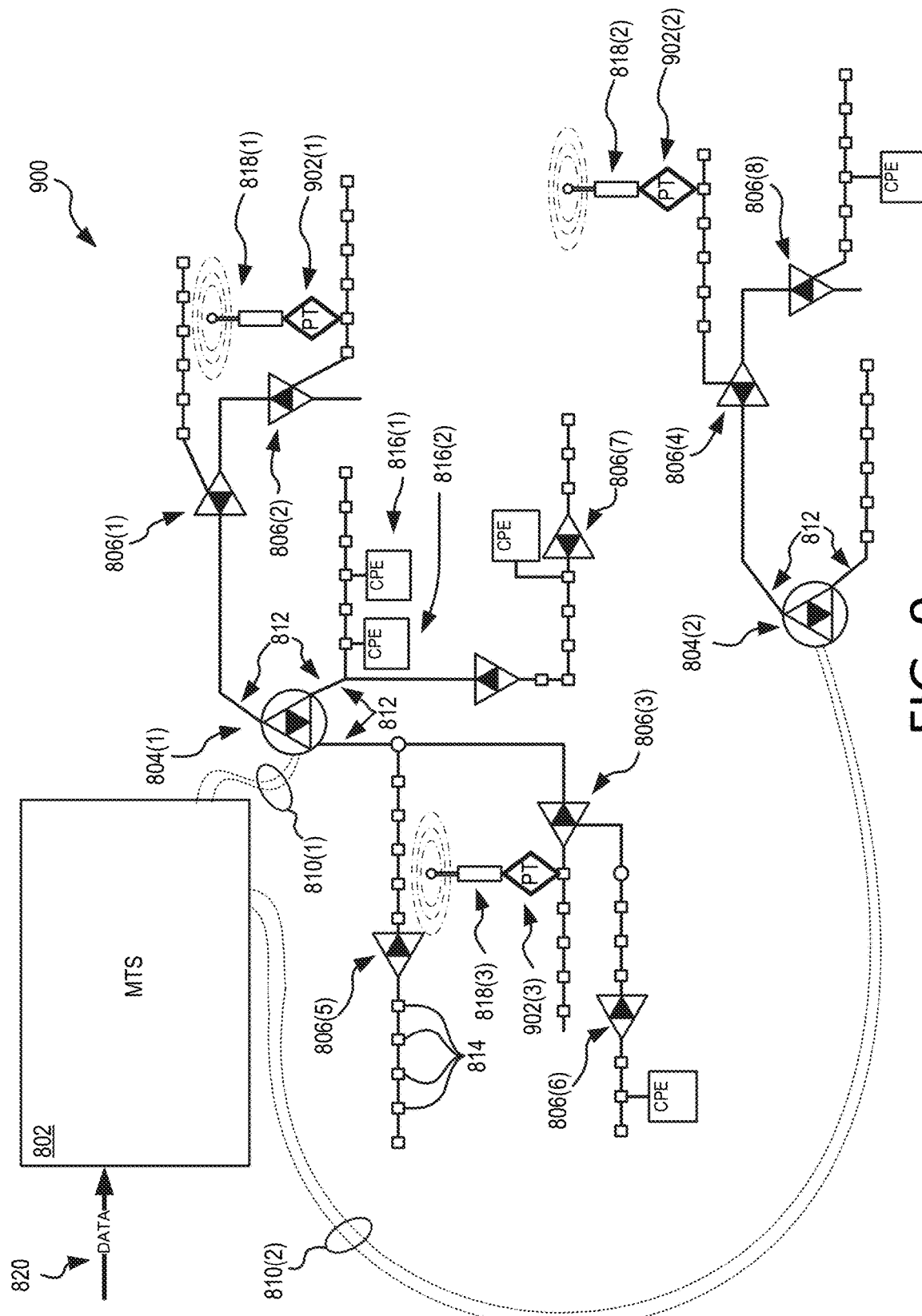
FIG. 9 is a schematic diagram illustrating another cable television network implementing a universal data link, according to an embodiment.

Changes may be made to network 800 without departing from the scope hereof. For example, the number and type of network clients could be changed, and/or the topology of network 800 could be changed. Additionally, the type of devices implementing universal data links could be changed. For example, FIG. 9 is a schematic diagram illustrating a cable television network 900 which is similar to network 800 but with universal data links moved from wireless base stations 818 to clients of wireless base stations 818, e.g., to mobile telephones (not shown) connecting to wireless base stations 818. Each wireless base station 818 is interfaced to a coaxial cable communication medium 812 via a respective PHY translator 902. Each PHY translator 902 translates physical data symbols between a coaxial cable communication medium 812 and a wireless communication medium of a respective wireless base station 818 without converting the data symbols into transmission entities. Thus, each PHY translator 902 is analogous to PHY translator 608(2) of FIG. 6. In this alternate embodiment, physical data symbols are transmitted between fiber optic communication mediums 810 and coaxial cable communication mediums 812, as well as between coaxial cable communication mediums 812 and wireless communication mediums of wireless base stations 822, without being converted into transmission entities. Applicant envisions the universal data link techniques disclosed herein being applicable to many more different types of networks, including but not limited those disclosed in U.S. patent application Ser. No. 15/878,258, filed on Jan. 23, 2018, which is incorporated herein by reference. U.S. patent application Ser. No. 15/878,258 discloses, in part, techniques for carrying and multiplexing a plurality of heterogenous optical transport signals on a single optical fiber.

Figure 10:
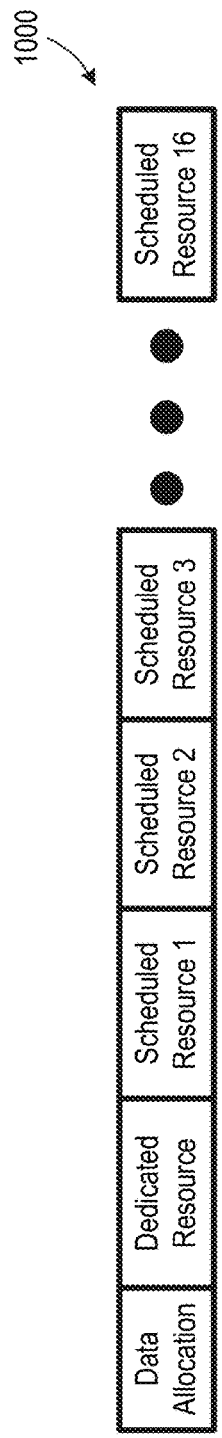
FIG. 10 is a schematic diagram illustrating a downlink transmission entity, according to an embodiment.

Particular embodiments of the networks disclosed herein are configured to control data transmission to achieve dedicated transmission channels, scheduled transmission channels, or a combination of dedicated and scheduled channels. For example, in some embodiments, first communication device 102 is further configured such that its universal data link 110 organizes data to be transmitted to sixteen second communication devices 104, such as in the FIG. 7 example embodiment, into downlink transmission entity 1000. One example of a downlink transmission entity 1000 is schematically illustrated in FIG. 10. Downlink transmission entity 1000 includes a data allocation portion, a dedicated resource portion, and 16 scheduled resource portions. Thus, a ratio of scheduled resources to dedicated resources is 16 to 1 in this embodiment.

Figure 11:
FIG. 11 is a schematic diagram illustrating a dedicated resource of the FIG. 10 downlink transmission entity.

The data allocation portion of downlink transmission entity 1000 provides, for example, transmission instructions for second communication devices 104. For example, the data allocation portion may specify a time, frequency, and/or other dimension for second communication devices 104 to transmit data. The data allocation portion of downlink transmission entity 1000 may also specify a configuration of downlink transmission entity 1000 and/or a configuration of counterpart uplink transmission entities. FIG. 11 is a schematic diagram illustrating the dedicated resource portion of downlink transmission entity 1000. The dedicated resource portion is divided into sixteen slots, i.e., one slot for each second communication device 104. Each second communication device 104 may use its respective dedicated slot for dedicated downlink communication with first communication device 102.

Figure 12:
FIG. 12 is a schematic diagram illustrating a scheduled resource of the FIG. 10 downlink transmission entity.

FIG. 12 is a schematic diagram illustrating one scheduled resource portion of downlink transmission entity 1000. Each scheduled resource portion includes 16 scheduled slots, which may be scheduled by first communication device 102 for transmitting data from first communication device 102 to one or more second communication devices 104. For example, if second communication device 104(2) needs to receive a large amount of data that could not be timely handed by its respective dedicated resource slot, first communication device 102 may schedule one or more scheduled resource portions of downlink transmission entity 1000 for transmission of data from first communication device 102 to second communication device 104(2). Accordingly, embodiments of first communication device 102 that are configured to generate downlink transmission entity 1000 can schedule downlink for multiple second communication devices 104.

The number of dedicated resources and/or the number of scheduled resources of downlink transmission entity 1000 could be modified without departing from the scope hereof. For example, several scheduled resource portions could be replaced with dedicated resource portions to achieve a more balanced ratio of scheduled resources to dedicated resources. As another example, the number of dedicated slots in the dedicated resource portion could be modified to support a different number of second communication devices 104.

In some embodiments, second communication devices 104 are further configured such that their universal data links 114 organize data to be transmitted to first communication device 102 into uplink transmission entity 1300. One example of a uplink transmission entity 1300 is schematically illustrated in FIG. 13. Uplink transmission entity 1300 is similar to downlink transmission entity 1000, but uplink transmission entity 1300 does not include a data allocation portion. FIG. 14 is a schematic diagram illustrating the dedicated resource portion of uplink transmission entity 1300, and FIG. 15 is a schematic diagram illustrating one scheduled resource portion of uplink transmission entity 1300. Uplink transmission entity 1300 operates in a manner similar to that of downlink transmission entity 1000. For example, each dedicated slot is for use by one second communication device 104 for dedicated data transmission to device first communication device 102, and uplink transmission entity can also be scheduled among second communication devices 104. Additionally, the number of dedicated resources, the number of scheduled resources, the number of dedicated slots, and/or the number of scheduled slots of uplink transmission entity 1300 could be modified without departing from the scope hereof.

Figure 16:
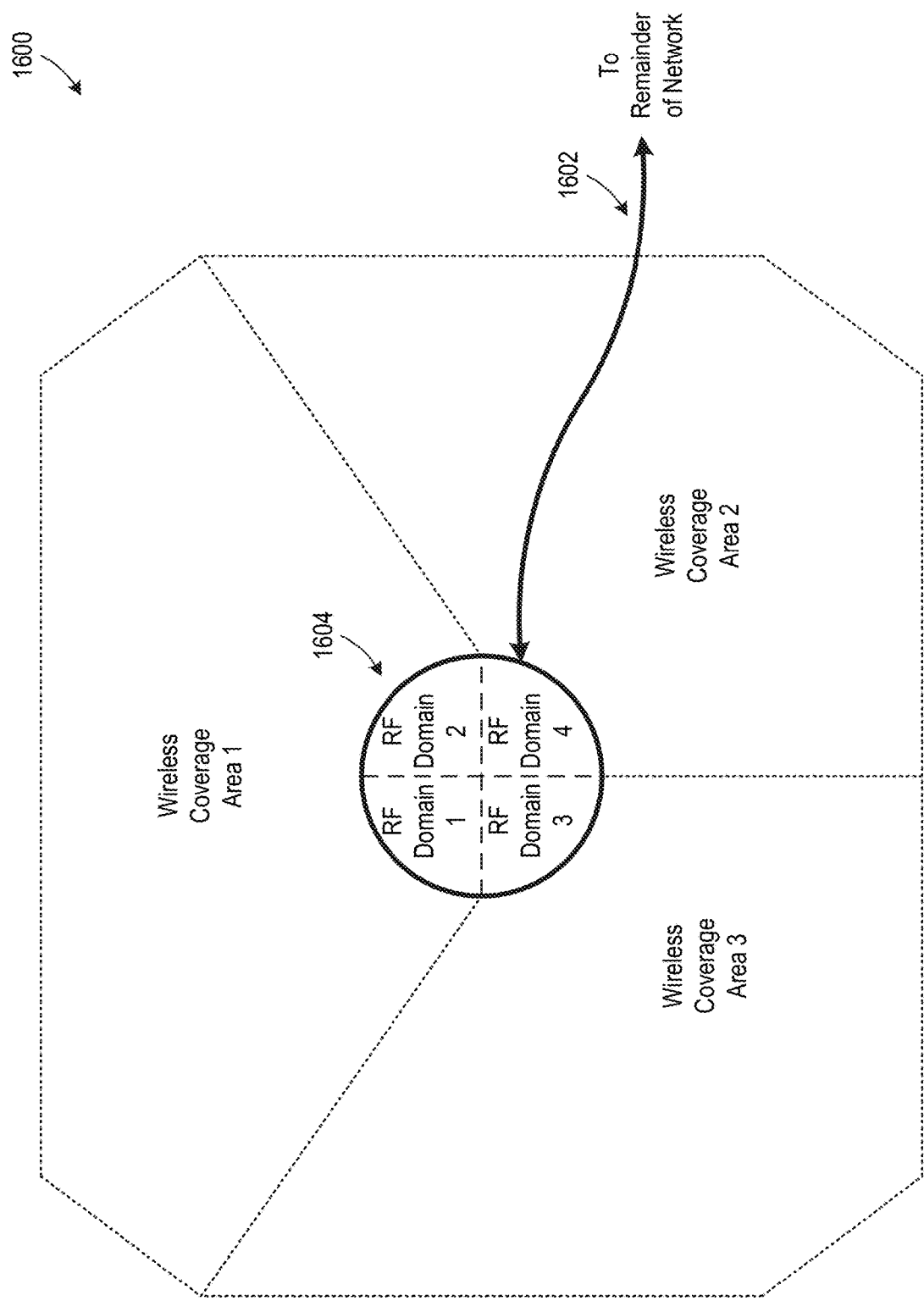
FIG. 16 is a schematic diagram illustrating a physical-layer translator node, according to an embodiment.

Applicant has found that particular combinations of communication media may be particularly advantageous in certain applications. For example, FIG. 16 is a schematic diagram illustrating a physical-layer translator node 1600 which is fed by a fiber optic communication medium 1602, such as from a first communication device 102 (not shown in FIG. 16). Node 1600 includes seven PHY translators, symbolically shown as a single element 1604 in FIG. 16. The first four PHY translators translate physical data symbols between fiber optic communication medium 1602 and respective coaxial cable communication mediums, labeled as radio-frequency (RF) domains, without converting the physical data symbols into transmission entities. The remaining three PHY translators translate physical data symbols between fiber optic communication medium 1602 and respective wireless communication mediums, labeled as wireless coverage areas, without converting the physical data symbols into transmission entities. Applicant has found that this particular combination of communication media may offer a good compromise between achieving high-performance wireless communication and maintaining sufficient capacity for coaxial cable communication media clients.

Figure 17:
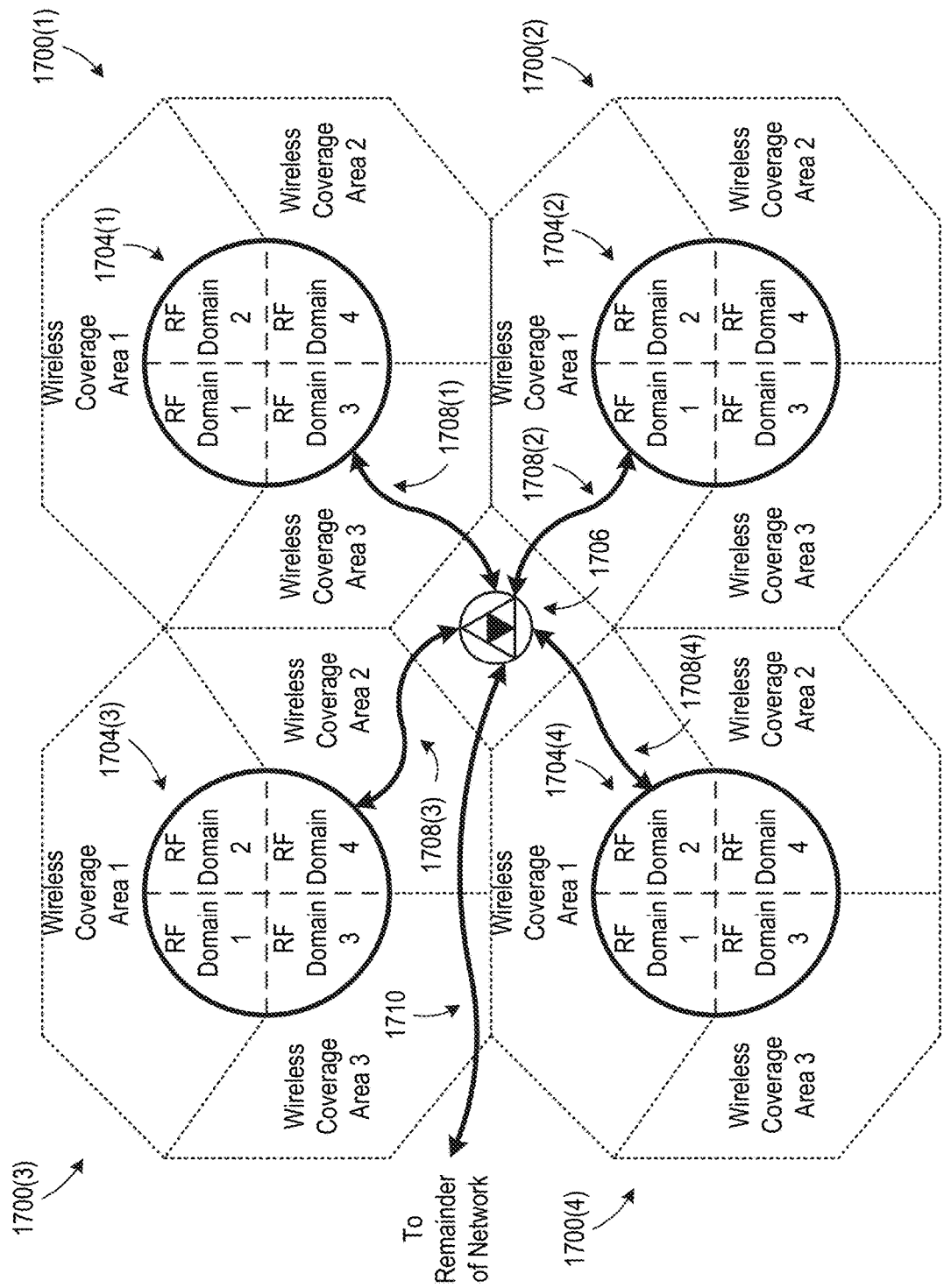
FIG. 17 is a schematic diagram illustrating a plurality of physical-layer translator nodes, according to an embodiment.

There is a trend in the communication industry to extend fiber optic communication media closer to end users, such as increase available capacity to end users. FIG. 17 illustrates one example of how physical-layer translator node 1600 of FIG. 16 can be modified to extend fiber optic communication media closer to end users. Specifically, FIG. 17 is a schematic diagram illustrating four physical-layer translator nodes 1700 which collectively cover approximately the same physical area as single physical-layer translator node 1600 of FIG. 16. Each node 1700 is communicatively coupled to a PHY translator 1706 by a respective fiber optic communication medium 1708, and PHY translator 1706 is fed by a fiber optic communication medium 1710, such as from a first communication device 102 (not shown in FIG. 17). PHY translator 1706 translates physical data symbols between fiber optic communication medium 1710 and fiber optic communication media 1708, without converting the data symbols to transmission entities.

Similar to node 1600 of FIG. 16, each node 1700 includes seven PHY translators, symbolically shown as a single element 1704 in each node 1700. In each node 1700, the first four PHY translators of the node translate physical data symbols between fiber optic communication medium 1708 and respective coaxial cable communication mediums, labeled as radio-frequency (RF) domains, without converting the physical data symbols into transmission entities. The remaining three PHY translators of the node translate physical data symbols between fiber optic communication medium 1708 and respective wireless communication mediums, labeled as wireless coverage areas, without converting the data symbols into transmission entities.

Figure 18:
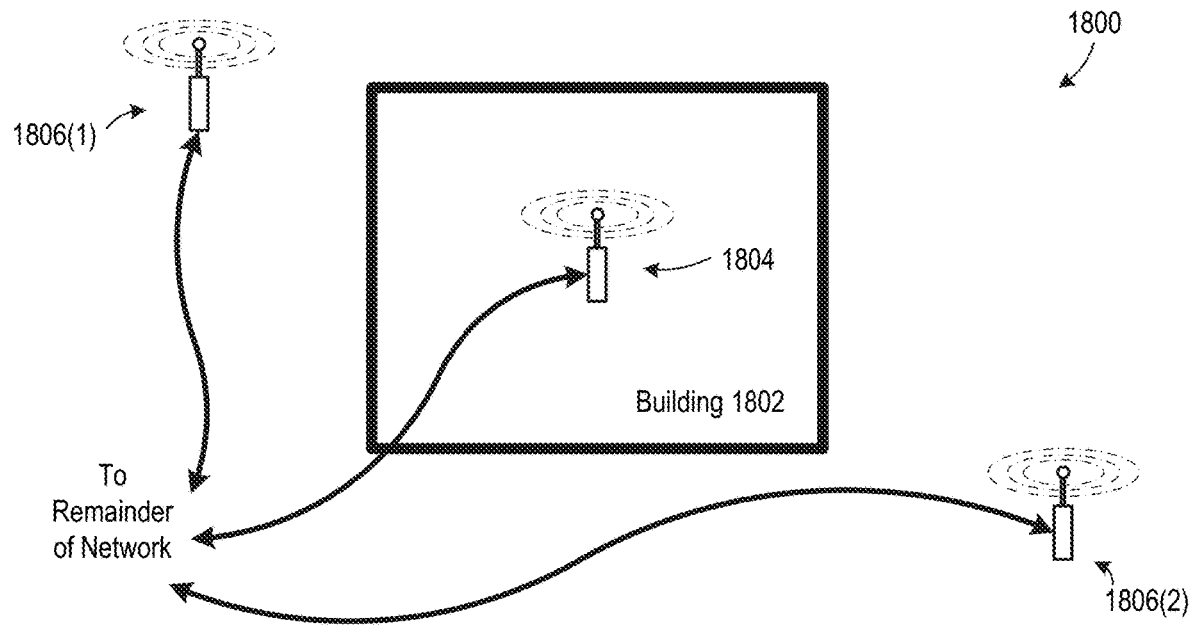
FIG. 18 is a schematic diagram illustrating a portion of a network providing wireless communication service within a building and outside of the building, according to an embodiment.

Applicant has additionally developed a wireless base station configuration which helps minimize power required to provide wireless communication coverage. FIG. 18 is a schematic diagram illustrating a portion 1800 of a network providing wireless communication service within a building 1802 and outside of building 1802. In network portion 1800, at least one indoor wireless base station 1804 is disposed within building 1802, and at least one outdoor wireless base station 1806 is disposed outside of building 1802. Importantly, indoor wireless base station(s) 1804 are configured to substantially cover only an interior of building 1802, and outdoor wireless base station(s) 1806 are configured to substantially cover only an exterior of building 1802. Consequently, neither signals of indoor wireless base stations 1804 nor signals of outdoor wireless base stations 1806 need to penetrate an envelope of building 1802. As a result, both indoor wireless base stations 1804 and outdoor wireless base stations 1806 can potentially operate at a relatively low power level, e.g., with an output power of 1 watt, which promotes energy conservation.

Figure 19:
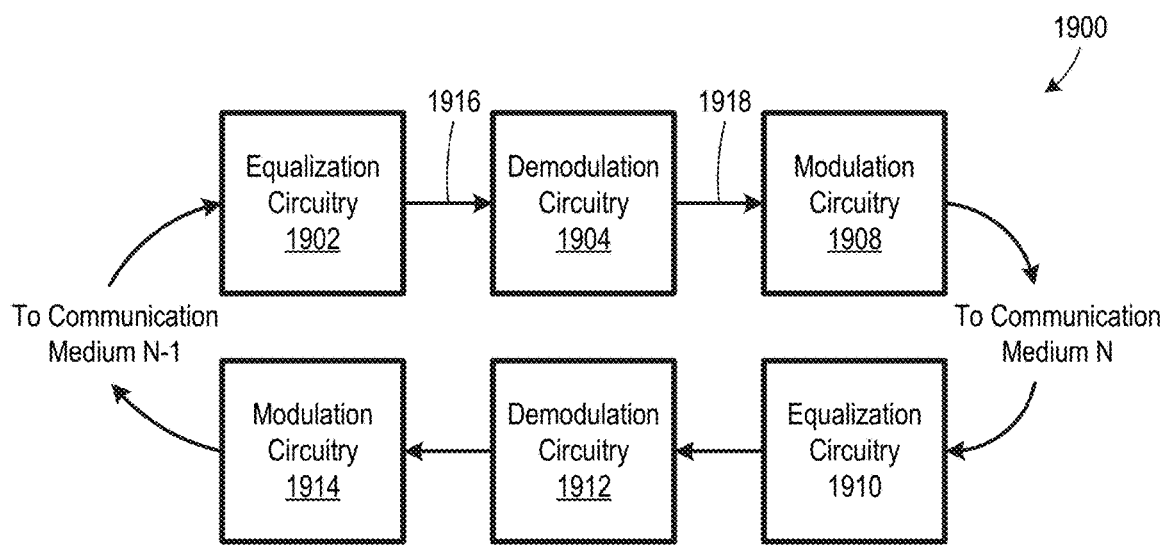
FIG. 19 is a schematic diagram illustrating a physical-layer translator, according to an embodiment.

FIG. 19 is a schematic diagram illustrating a PHY translator 1900. PHY translator 1900 is one possible embodiment of PHY translator 108, but it should be appreciated that PHY translator 108 could be implemented in a different manner than that illustrated in FIG. 19. PHY translator 1900 includes equalization circuitry 1902, demodulation circuitry 1904, modulation circuitry 1908, equalization circuitry 1910, demodulation circuitry 1912, and modulation circuitry 1914. Equalization circuitry 1902, demodulation circuitry 1904, and modulation circuitry 1908 collectively translate physical data symbols in a forward direction, i.e., from communication medium N−1 to communication medium N. Specifically, equalization circuitry 1902 receives a carrier signal from communication medium N−1 and generates a corrected signal 1916, to correct for distortion in the carrier signal, such as by causing a frequency response of communication medium N−1 to be essentially flat in at least a range of frequencies occupied by the carrier signal. In a particular embodiment, equalization circuitry 1902 includes a digital equalizer implementing a linear equalizer, a decision feedback equalizer, a blind equalizer, a Viterbi equalizer, a BCJR equalizer, or a Turbo equalizer.

Demodulation circuitry 1904 demodulates corrected signal 1916 to generate a demodulated signal 1918. Demodulation circuitry 1904 demodulates corrected signal 1916 according a MS of communication medium N−1. Modulation circuitry 1908 modulates a carrier signal to be transmitted by communication medium N according to demodulation signal 1918. Modulation circuitry 1908 modulates the carrier signal according to the MS of communication medium N.

Equalization circuitry 1910, demodulation circuitry 1912, and modulation circuitry 1914 collectively translate physical data symbols in a reverse direction, i.e., from communication medium N to communication medium N−1. Equalization circuitry 1910, demodulation circuitry 1912, modulation circuitry 1914 operate in the same manner as equalization circuitry 1902, demodulation circuitry 1904, and modulation circuitry 1908, respectively, but translate data symbols in a reverse direction.

In some embodiments, modulation circuitry 1908 and modulation circuitry 1914 perform delta-sigma modulation, and demodulation circuitry 1904 and demodulation circuitry 1912 perform delta-sigma demodulation. Some examples of delta-sigma modulation and delta-sigma demodulation are disclosed in U.S. patent application Ser. No. 15/875,336, filed on Jan. 26, 2018, which is incorporated herein by reference. Examples of multi-band delta-sigma modulation are disclosed in U.S. patent application Ser. No. 16/191,315, filed on Nov. 14, 2018, which is incorporated herein by reference.

Figure 20:
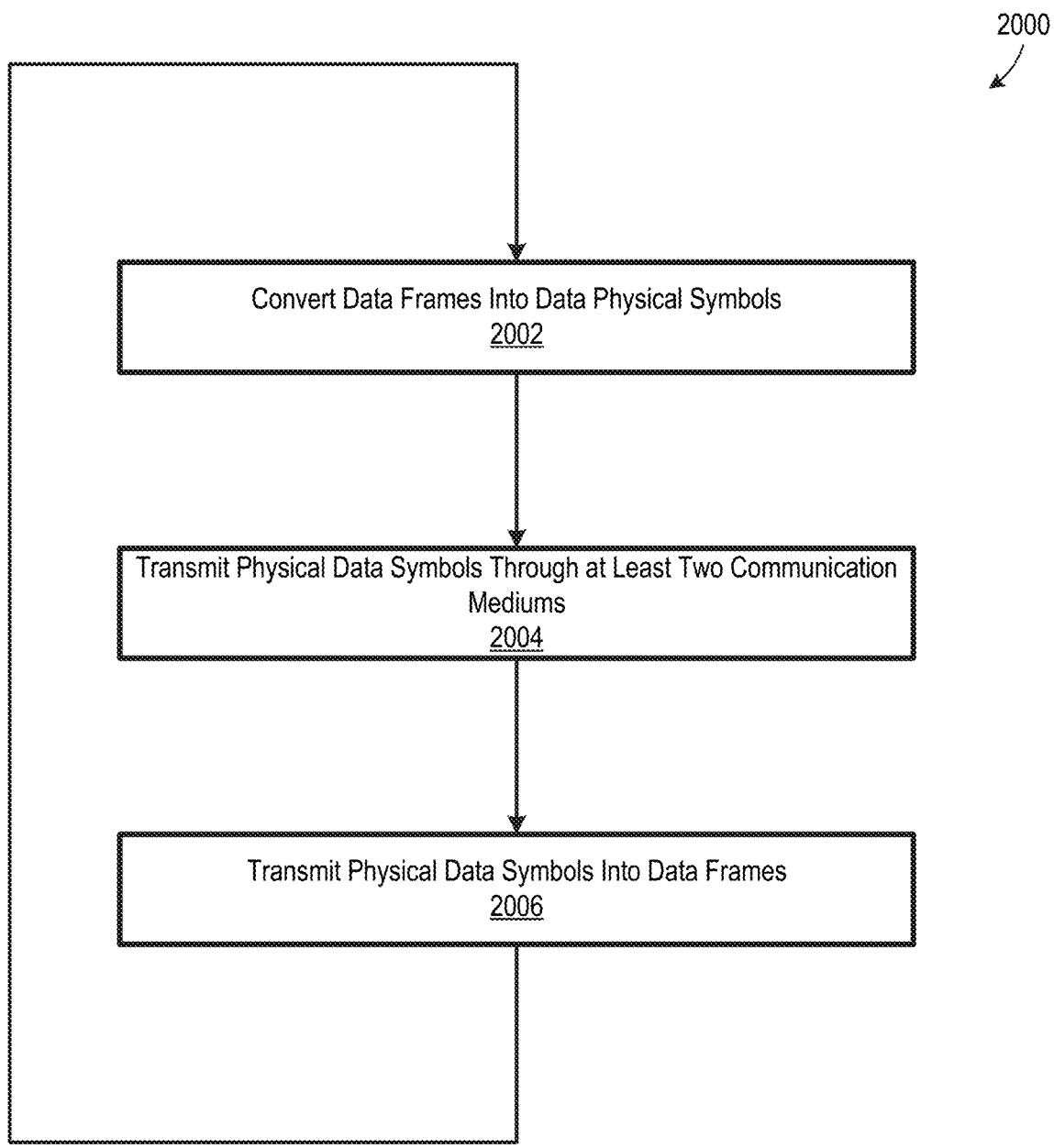
FIG. 20 is a flow chart illustrating a method for transmitting data through a multi-media communication network using a universal data link, according to an embodiment.

FIG. 20 is a flow chart illustrating a method 2000 for transmitting data through a multi-media communication network using a universal data link. In block 2002, transmission entities are converted into physical data symbols at a first communication device. In one example of block 2002, first communication device 102 converts transmission entities 122 into physical data symbols 124 (see, e.g., FIG. 1). In block 2004, the physical data symbols are transmitted through at least at least two different types of communication media at a common data transmission rate from the first communication device to a second communication device. In one example of block 2002, physical data symbols 124 are transmitted through communication media 106 at a common data transmission rate from first communication device 102 to second communication device 104. In block 2006, the physical data symbols are converted into transmission entities at the second communication device. In one example of block 2006, second communication device 104 converts physical data symbols 124 into transmission entities 126.

Combinations of Features

Features described above may be combined in various ways without departing from the scope hereof. The following examples illustrate some possible combinations:

(A1) A method for transmitting data through a multi-media communication network may include (1) converting transmission entities into physical data symbols at a first communication device, (2) transmitting the physical data symbols from the first communication device to a second communication device through at least two different types of communication media using only lower PHY layers of the at least two different types of communication media, and (3) converting the physical data symbols into transmission entities at the second communication device.

(A2) In the method denoted as (A1), the least two different types of communication media may include a first communication medium and a second communication medium, and the method may further include translating physical data symbols received from the first communication medium for transmission through the second communication medium.

(A3) In the method denoted as (A2), translating the physical data symbols transmitted through the first communication medium for transmission through the second communication medium may be performed without converting the data symbols into transmission entities.

(A4) In any one of the methods denoted as (A2) and (A3), translating the data symbols transmitted through the first communication medium for transmission through the second communication medium may include (1) demodulating one or more carrier signals received from the first communication medium to yield the physical data symbols and (2) modulating one or more carrier signals to be transmitted through the second communication medium according to the physical data signals.

(A5) In the method denoted as (A4), translating the physical data symbols transmitted through the first communication medium for transmission through the second communication medium may further include equalizing the one or more carrier signals received from the first communication medium, prior to demodulating the one or more carrier signals received from the first communication medium.

(A6) Any one of the methods denoted as (A2) through (A5) may further include translating the physical data symbols at the common data transmission rate without buffering the data symbols.

(A7) In any one of the methods denoted as (A2) through (A6), the first communication medium may have a different maximum communication bandwidth than the second communication medium.

(A8) Any one of the methods denoted as (A2) through (A7) may further include (1) transferring the physical data symbols through the first communication medium using a first modulation scheme (MS) and (2) transferring the data symbols through the second communication medium using a second MS that is different from the first MS.

(A9) In any one of the methods denoted as (A2) through (A8), the first communication medium may include a fiber optic communication medium and the second communication medium may include a coaxial cable communication medium.

(A10) In any one of the methods denoted as (A2) through (A8), the first communication medium may include a fiber optic communication medium and the second communication medium may include a wireless cable communication medium.

(A11) Any one of the methods denoted as (A1) through (A10) may further include transmitting the data symbols from the first communication device to the second communication device with a predetermined latency.

(A12) Any one of the methods denoted as (A1) through (A11) may further include transmitting the physical data symbols from the first communication device to the second communication device using only one data transmission protocol.

(A13) In the method denoted as (A12), the only one data transmission protocol may be selected from the group consisting of a long-term evolution (LTE) protocol, a data over cable service interface specification (DOCSIS) protocol, scheduled WiFi protocol, a 5G wireless transmission protocol, and a 6G wireless transmission protocol.

(A14) In any one of the methods denoted as (A1) through (A13), the common data transmission rate may be selected to not exceed a data transmission rate of a communication medium of the at least two different types of communication media having a lowest data transmission rate.

(A15) Any one of the methods denoted as (A1) through (A14) may further include scheduling transmission of data through the multi-media communication network.

(A16) Any one of the methods denoted as (A1) through (A15) may further include, prior to converting the transmission entities into physical data symbols at the first communication device, generating the transmission entities such that each transmission entity includes a first portion for dedicated data transmission and a second portion for scheduled data transmission.

(A17) Any one of the methods denoted as (A1) through (A16) may further include (1) prior to converting the transmission entities into physical data symbols at the first communication device, generating the transmission entities such that each transmission entity includes an error-correcting code and (2) after converting the physical data symbols into transmission entities at the second communication device, correcting a transmission error using the error-correcting code of at least one of the transmission entities.

(A18) The method denoted as (A17) may further include selecting a format of the error-correcting code of at least one of the transmission entities according to a type of data carried by the transmission entities.

(B1) A network implementing a universal data link may include (1) a first communication device configured to convert transmission entities into physical data symbols, (2) a second communication device configured to convert the physical data symbols into transmission entities, (3) at least a first communication medium and a second communication medium communicatively coupled between the first communication device and the second communication device, and (4) a first physical-layer (PHY) translator configured to translate the physical data symbols as received from the first communication medium for transmission through the second communication medium without converting the physical data symbols into transmission entities.

(B2) In the network denoted as (B1), the first PHY translator may be further configured to (1) demodulate one or more carrier signals received from the first communication medium to yield the physical data symbols and (2) modulate one or more carrier signals to be transmitted through the second communication medium according to the physical data signals.

(B3) In the network denoted as (B2), the first PHY translator may be further configured to equalize the one or more carrier signals received from the first communication medium, prior to demodulating the one or more carrier signals received from the first communication medium.

(B4) In any one of the networks denoted as (B1) through (B3), the first communication medium may have a different maximum communication bandwidth than the second communication medium.

(B5) In any one of the networks denoted as (B1) through (B4), the first communication medium may include a fiber optic cable communication medium and the second communication medium may include a coaxial cable communication medium.

(B6) In any one of the networks denoted as (B1) through (B4), the first communication medium may include a fiber optic cable communication medium, and the second communication medium may include a wireless communication medium.

(B7) Any one of the networks denoted as (B1) through (B6) may further include (1) a third communication medium communicatively coupled between the second communication medium and the second communication device and (2) a second PHY translator configured to translate physical data symbols received from the second communication medium for transmission through the third communication medium without converting the physical data symbols into transmission entities.

(B8) In any one of the networks denoted as (B1) through (B7), the first communication device may include a telecommunication network switch.

(B9) In any one of the networks denoted as (B1) through (B7), the first communication device may include a modem termination system.

(B10) In any one of the networks denoted as (B1) through (B9), the second communication device may include a wireless communication base station.

(B11) In any one of the networks denoted as (B1) through (B9), the second communication device may include a wireless access point.

(B12) In any one of the networks denoted as (B1) through (B9), the second communication device may include a modem.

(B13) In any one of the networks denoted as (B1) through (B9), the second communication device may include an optical network termination device.

(B14) In any one of the networks denoted as (B1) through (B9), the second communication device may include a user device.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for transmitting data through a multi-media communication network, comprising:
   converting transmission entities into physical data symbols at a first communication device;
   transmitting the physical data symbols from the first communication device to a second communication device through at least two different communication mediums communicatively coupled in series, using only lower physical (PHY) stack layers of the at least two different communication mediums; and
   converting the physical data symbols into transmission entities at the second communication device.

2. The method of claim 1, wherein the at least two different communication mediums comprise a first communication medium and a second communication medium, and the method further comprises:
   receiving, at a PHY translator, the physical data symbols from the first communication medium; and
   using the PHY translator, translating the physical data symbols for transmission through the second communication medium.

3. The method of claim 2, wherein translating the physical data symbols is performed without converting the physical data symbols into transmission entities.

4. The method of claim 3, wherein translating the physical data symbols comprises:
   demodulating one or more carrier signals received from the first communication medium to yield the physical data symbols; and
   modulating one or more carrier signals to be transmitted through the second communication medium according to the physical data signals.

5. The method of claim 4, wherein translating the physical data symbols further comprises equalizing the one or more carrier signals received from the first communication medium, prior to demodulating the one or more carrier signals received from the first communication medium.

6. The method of claim 2, further comprising:
   transferring the physical data symbols through the first communication medium using a first modulation scheme (MS); and
   transferring the physical data symbols through the second communication medium using a second MS that is different from the first MS.

7. The method of claim 1, further comprising transmitting the physical data symbols from the first communication device to the second communication device with a deterministic latency.

8. The method of claim 1, further comprising transmitting the physical data symbols from the first communication device to the second communication device using only one data transmission protocol.

9. The method of claim 8, wherein the only one data transmission protocol is selected from the group consisting of a long-term evolution (LTE) protocol, a data over cable service interface specification (DOCSIS) protocol, a scheduled WiFi protocol, a 5G wireless transmission protocol, and a 6G wireless transmission protocol.

10. The method of claim 1, further comprising:
    prior to converting the transmission entities into physical data symbols at the first communication device, generating the transmission entities such that each transmission entity includes an error-correcting code; and
    after converting the physical data symbols into transmission entities at the second communication device, correcting a transmission error using the error-correcting code of at least one of the transmission entities.

11. The method of claim 10, further comprising selecting a format of the error-correcting code of at least one of the transmission entities according to a type of data carried by the transmission entities.

12. The method of claim 1, wherein the at least two different communication mediums comprise a first communication medium and a second communication medium, the first communication medium and the second communication operating according to different communication protocols.

13. A network implementing a universal data link, comprising:

a first communication device configured to convert transmission entities into physical data symbols;

a second communication device configured to convert the physical data symbols into transmission entities;

at least a first communication medium and a second communication medium communicatively coupled in series between the first communication device and the second communication device, the first and second communication mediums having different respective configurations; and a first physical-layer (PHY) translator configured to:
receive the physical data symbols from the first communication medium, and
translate the physical data symbols for transmission through the second communication medium without converting the physical data symbols into transmission entities between the first and second communication mediums.

14. The network of claim 13, wherein the first PHY translator is further configured to:
demodulate one or more carrier signals received from the first communication medium to yield the physical data symbols; and
modulate one or more carrier signals to be transmitted through the second communication medium according to the physical data signals.

15. The network of claim 13, wherein the first communication medium has a different maximum communication bandwidth than the second communication medium.

16. The network of claim 13, wherein the first communication medium comprises a fiber optic cable communication medium and the second communication medium comprises a coaxial cable communication medium.

17. The network of claim 13, wherein the first communication medium comprises a fiber optic cable communication medium and the second communication medium comprises a wireless communication medium.

18. The network of claim 13, further comprising:
a third communication medium communicatively coupled between the second communication medium and the second communication device, the second and third communication mediums having different respective configurations; and
a second PHY translator configured to:
receive the physical data symbols from the second communication medium, and
translate the physical data symbols for transmission through the third communication medium without converting the physical data symbols into transmission entities between the second and third communication mediums.

19. The network of claim 13, wherein the first communication device comprises one of a telecommunication network switch and a modem termination system.

20. The network of claim 13, wherein the second communication device comprises one of a wireless communication base station, a wireless access point, a modem, and an optical network termination device.

21. The network of claim 13, wherein the second communication device comprises a user device.

* * * * *